US011251739B2

(12) United States Patent
Maeda et al.

(10) Patent No.: US 11,251,739 B2
(45) Date of Patent: Feb. 15, 2022

(54) VEHICLE DRIVING DEVICE

(71) Applicant: PANASONIC INTELLECTUAL PROPERTY MANAGEMENT CO., LTD., Osaka (JP)

(72) Inventors: Yoshihiko Maeda, Osaka (JP); Hisazumi Watanabe, Kanagawa (JP); Yuji Aoki, Osaka (JP); Akitaka Yoshikawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/876,643

(22) Filed: May 18, 2020

(65) Prior Publication Data
US 2021/0006195 A1 Jan. 7, 2021

(30) Foreign Application Priority Data

Jul. 1, 2019 (JP) .............................. JP2019-122702
Jul. 1, 2019 (JP) .............................. JP2019-122706
Nov. 22, 2019 (JP) .............................. JP2019-211210

(51) Int. Cl.
*H02P 1/00* (2006.01)
*H02P 29/024* (2016.01)
(Continued)

(52) U.S. Cl.
CPC .......... *H02P 29/0241* (2016.02); *B60L 15/20* (2013.01); *B60L 53/20* (2019.02); *H02M 7/53871* (2013.01); *H02P 27/08* (2013.01)

(58) Field of Classification Search
CPC ...... H02P 29/0241; H02P 27/08; B60L 53/20; B60L 15/20; H02M 7/53871
See application file for complete search history.

(56) References Cited

U.S. PATENT DOCUMENTS

2010/0072942 A1  3/2010 Kowalewski et al.
2014/0191700 A1  7/2014 Eberlein et al.
(Continued)

FOREIGN PATENT DOCUMENTS

CN  202557320 U  * 11/2012
CN  102368604 B  * 11/2013
(Continued)

OTHER PUBLICATIONS

Office Action from the German Patent and Trademark Office in German Pat. Appl. No. 102020112679.4, dated Dec. 22, 2020, together with an English language translation thereof.
(Continued)

*Primary Examiner* — Karen Masih
(74) *Attorney, Agent, or Firm* — Greenblum & Bernstein, P.L.C.

(57) ABSTRACT

A vehicle driving device includes an inverter which drives a motor. The inverter includes: a three-phase bridge circuit including a plurality of switching elements; a three-phase short circuit which short-circuits three phases of the motor via the three-phase bridge circuit; and a control circuit. The control circuit includes: a microprocessor which drives the three-phase bridge circuit; a malfunction notification circuit which outputs a malfunction notification signal when the microprocessor is malfunctioning; and a latch circuit which holds the malfunction notification signal outputted from the malfunction notification circuit. The control circuit outputs a three-phase short-circuit drive signal which drives the three-phase short circuit, based on the malfunction notification signal held by the latch circuit.

11 Claims, 22 Drawing Sheets

(51) Int. Cl.
　　　*H02P 27/08*　　　(2006.01)
　　　*B60L 15/20*　　　(2006.01)
　　　*B60L 53/20*　　　(2019.01)
　　　*H02M 7/5387*　　(2007.01)

(56) References Cited

U.S. PATENT DOCUMENTS

| | | | |
|---|---|---|---|
| 2015/0280624 | A1 | 10/2015 | Sotome |
| 2019/0372505 | A1 | 12/2019 | Chen et al. |

FOREIGN PATENT DOCUMENTS

| | | |
|---|---|---|
| CN | 108696226 | 10/2018 |
| DE | 233258 | 2/1986 |
| DE | 19905457 | 8/2000 |
| DE | 102009028080 | 4/2010 |
| DE | 102011081173 | 2/2013 |
| JP | 2007-014172 | 1/2007 |
| JP | 2015-198503 | 11/2015 |
| JP | 2018-046718 | 3/2018 |

OTHER PUBLICATIONS

Mikrocontroller. In: Wikipedia. Date/Time: Jun. 6, 2019 11.30 am. URL: https://de.wikipedia.org/w/index.php?title=Mikrocontroller&oldid=189301762, together with an English language version from Wikipedia in the US (URL: https://en.wikipedia.org/wiki/Microcontroller).

Elektroauto. In: Wikipedia. Date: Jun. 30, 2019. URL: https://de.wikipedia.org/w/index.php?title=Elektroauto&oldid=189985934, together with an English language version from Wikipedia in the US (URL: https://en.wikipedia.org/wiki/Electric_vehicle_battery).

Watchdog. In: Wikipedia. Date/Time: Feb. 23, 2019 11.54 am. URL: https://de.wikipedia.org/w/index.php?title=Watchdog&oldid=185958783, together with an English language version from Wikipedia in the US (URL: https://en.wikipedia.org/wiki/Watchdog_timer).

Office Action from Japan Patent Office (JPO) in Japanese Patent Appl. No. 2019-211210, dated Feb. 9, 2021, together with an English language translation.

\* cited by examiner

VEHICLE DRIVING DEVICE

CROSS REFERENCE TO RELATED APPLICATIONS

The present application is based on and claims priority of Japanese Patent Application No. 2019-122702 filed on Jul. 1, 2019, priority of Japanese Patent Application No. 2019-122706 filed on Jul. 1, 2019, and priority of Japanese Patent Application No. 2019-211210 filed on Nov. 22, 2019.

FIELD

The present disclosure relates to a vehicle driving device which drives a vehicle by controlling motor driving.

BACKGROUND

Due to fuel efficiency regulations and $CO_2$ regulations, vehicles are increasingly electrified, for example, electric vehicles (EVs), hybrid electric vehicles (HEVs), plug-in hybrid vehicles (PHVs), and fuel cell vehicles (FCVs). In order to enhance the vehicle electric efficiency, permanent magnet motors are increasingly used as vehicle driving motors.

Permanent magnet motors are highly efficient as they do not require exciting current; however, induced voltage generated by the field magnetic flux of the permanent magnet increases in proportion to the rotational speed (hereinafter, also referred to as the number of revolutions or angular velocity), and exceeds an output voltage of an inverter when the rotational speed reaches a certain rotational speed or higher. Thus, when rotating a permanent magnet motor at high speed, magnetic-flux weakening control is performed to inhibit induced voltage generated by the field magnetic flux of the permanent magnet.

Meanwhile, when, for example, an anomaly in the vehicle driving device which has occurred at the time of regeneration opens a relay between the inverter and a high-voltage battery and causes contact failure with a terminal of the high-voltage battery, and thus results in a cut off of a path for recovering regenerative power, high induced voltage generated by the rotation of the permanent magnet motor may lead to a breakdown of switching elements of the inverter.

To address this, three-phase short-circuit control of placing the three phases of the permanent magnet motor in a short-circuit state and eliminating voltage induced from the permanent magnet motor is performed. To illustrate an example of the three-phase short-circuit control, Patent Literature (PTL) 1 discloses a vehicle driving device including: an inverter which drives a permanent magnet motor; an anomaly detector which detects an anomaly such as overvoltage that occurs in the inverter; and a three-phase short circuit which places the inverter in a three-phase short-circuit control state. With this vehicle driving device, when the anomaly detector detects an anomaly, the inverter is switched from a three-phase pulse width modulation (PWM) control state to the three-phase short-circuit control state, so as to reduce overvoltage on the inverter.

CITATION LIST

Patent Literature

PTL 1: Japanese Unexamined Patent Application Publication No. 2015-198503

SUMMARY

However, the vehicle driving device according to PTL 1 can be improved upon. In view of this, the present disclosure provides a vehicle driving device capable of improving upon the above related art.

A vehicle driving device according to an aspect of the present disclosure is a vehicle driving device including an inverter which drives a permanent magnet motor, the inverter including: a three-phase bridge circuit including a plurality of switching elements; a three-phase short circuit which short-circuits three phases of the permanent magnet motor via the three-phase bridge circuit; and a control circuit. The control circuit includes: a microprocessor which drives the three-phase bridge circuit; a malfunction notification circuit which outputs a malfunction notification signal when the microprocessor is malfunctioning; and a latch circuit which holds the malfunction notification signal outputted from the malfunction notification circuit. The control circuit outputs a three-phase short-circuit drive signal which drives the three-phase short circuit, based on the malfunction notification signal held by the latch circuit.

A vehicle driving device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
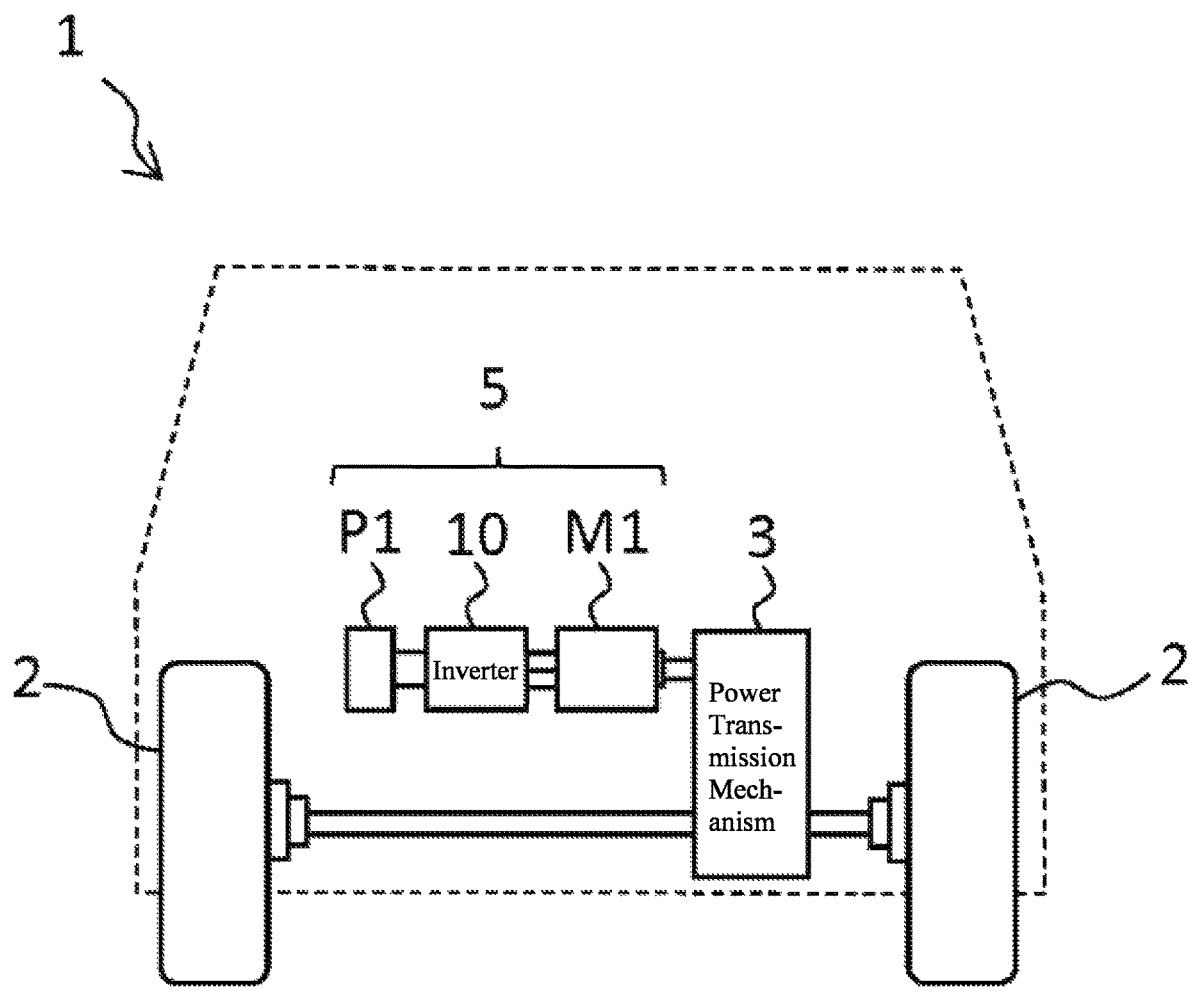
FIG. 1 is a schematic view illustrating an example of an electric vehicle including a vehicle driving device according to Embodiment 1.

According to the vehicle driving device disclosed in PTL 1, when overvoltage occurs, three-phase short-circuit control is forcedly performed by hardware even if the overvoltage can be inhibited. As such, there is a risk of producing unnecessary brake torque by forcedly performing the three-phase short-circuit control even when the overvoltage can be inhibited by performing, for example, magnetic-flux weakening control in response to detection, in advance, of potential overvoltage attributable to a relay almost opened or potential contact failure in a battery terminal. To address this, a configuration is conceivable in which the microprocessor detects overvoltage in advance, selects whether to perform, for example, magnetic-flux weakening control or the three-phase short-circuit control, and performs the three-phase short-circuit control when the overvoltage needs to be inhibited even at the expense of producing a brake torque. With this configuration, however, when the microprocessor is malfunctioning, large induced voltage is generated by the permanent magnet motor, and three-phase short-circuit control cannot be performed when needed.

The present disclosure provides a reliable vehicle driving device capable of performing three-phase short-circuit control even when the microprocessor is malfunctioning.

Hereinafter, a vehicle driving device according to the present disclosure will be described.

A vehicle driving device according to an aspect of the present disclosure is a vehicle driving device including an inverter which drives a permanent magnet motor, the inverter including: a three-phase bridge circuit including a plurality of switching elements; a three-phase short circuit which short-circuits three phases of the permanent magnet motor via the three-phase bridge circuit; and a control circuit. The control circuit includes: a microprocessor which drives the three-phase bridge circuit; a malfunction notification circuit which outputs a malfunction notification signal when the microprocessor is malfunctioning; and a latch circuit which holds the malfunction notification signal outputted from the malfunction notification circuit. The control circuit outputs a three-phase short-circuit drive signal which drives the three-phase short circuit, based on the malfunction notification signal held by the latch circuit.

In such a manner, by holding the malfunction notification signal which notifies that the microprocessor is malfunctioning, it is possible to perform the three-phase short-circuit control on the permanent magnet motor as necessary even when the microprocessor is malfunctioning. Accordingly, it is possible to increase reliability of the vehicle driving device.

The control circuit may output the three-phase short-circuit drive signal when the latch circuit holds the malfunction notification signal and a rotational speed of the permanent magnet motor is greater than or equal to a predetermined rotational speed.

As described, by outputting the three-phase short-circuit drive signal when the rotational speed of the permanent magnet motor is greater than or equal to the predetermined rotational speed, it is possible to perform the three-phase short-circuit control when the permanent magnet motor rotates at high speed and is likely to generate induced voltage. The three-phase short-circuit control is not performed when the rotational speed of the permanent magnet motor is less than the predetermined rotational speed, and thus, it is possible to inhibit generation of braking torque when the permanent magnet motor rotates at low speed. Accordingly, it is possible to increase reliability of the vehicle driving device.

The control circuit may determine that the rotational speed of the permanent magnet motor is greater than or equal to the predetermined rotational speed when an integral of an output voltage outputted from a rotational position sensor provided to the permanent magnet motor is not below a threshold.

Accordingly, it is possible to reliably and easily determine whether the rotational speed of the permanent magnet motor is greater than or equal to the predetermined rotational speed. Accordingly, it is possible to increase reliability of the vehicle driving device.

The malfunction notification circuit may be a watchdog timer circuit which notifies whether the microprocessor is malfunctioning, and the malfunction notification signal may be a reset signal of the watchdog timer circuit.

Accordingly, the malfunction notification signal can be reliably held by the latch circuit. This makes it possible to reliably perform the three-phase short-circuit control on the permanent magnet motor even when the microprocessor is malfunctioning. Accordingly, it is possible to increase reliability of the vehicle driving device.

The malfunction notification circuit may output the reset signal to the microprocessor, and when the microprocessor has succeeded in restarting properly based on the reset signal, the microprocessor may output a latch release signal which releases the malfunction notification signal held by the latch circuit.

Accordingly, the three-phase short-circuit control is not performed when the microprocessor has started to function properly again, and thus, it is possible to inhibit unnecessary three-phase short-circuit control. As a result, the three-phase short-circuit control on the permanent magnet motor can be performed when absolutely necessary, and it is thus possible to increase reliability of the vehicle driving device.

The microprocessor may output a malfunction simulation signal to the latch circuit when the reset signal is not received, the malfunction simulation signal simulatively indicating a state in which the microprocessor is malfunctioning, and the control circuit may output the three-phase short-circuit drive signal based on the malfunction simulation signal.

By outputting the three-phase short-circuit drive signal based on the malfunction simulation signal in such a manner, and simulatively performing the three-phase short-circuit control, it is possible to promptly discover latent malfunctions of the latch circuit and the three-phase short circuit. Accordingly, it is possible to increase reliability of the vehicle driving device.

The microprocessor may output the malfunction simulation signal when the permanent magnet motor is in motion under a predetermined condition.

Accordingly, it is possible to simulatively perform the three-phase short-circuit control when the torque of the permanent magnet motor at the time when the three-phase short-circuit control is performed is less than or equal to a torque which does not affect the driving of the vehicle driving device. Accordingly, it is possible to increase reliability of the vehicle driving device.

The three-phase short circuit may short-circuit the three phases of the permanent magnet motor when the three-phase short-circuit drive signal is received, and the control circuit may obtain information on at least one of (i) a change in current flowing through the three phases of the permanent magnet motor, (ii) a change in a current phase, or (iii) a change in a direct current (DC) voltage at the three-phase bridge circuit, and determine, based on the information, whether the three-phase short circuit and the latch circuit are malfunctioning.

In such a manner, by determining, based on the information, whether or not the three-phase short circuit and the latch circuit are malfunctioning, it is possible to reliably discover latent malfunctions of the latch circuit and the three-phase short circuit. Accordingly, it is possible to increase reliability of the vehicle driving device.

The inverter may further include an overvoltage detection circuit which detects a predetermined overvoltage at the three-phase bridge circuit, the predetermined overvoltage being a direct current (DC) voltage, the overvoltage detection circuit may output a three-phase short-circuit signal to the three-phase short circuit when the predetermined overvoltage is detected, and the control circuit may force the overvoltage detection circuit to output the three-phase short-circuit signal, and may detect an anomaly in three-phase short-circuiting based on at least one of (i) a change in current flowing through the three phases, (ii) a change in a current phase of the three phases, or (iii) a change in the DC voltage, which occur when the overvoltage detection circuit forcedly outputs the three-phase short-circuit signal.

With the vehicle driving device having the above configuration, the control circuit can appropriately detect an anomaly in the three-phase short-circuiting, by forcing the overvoltage detection circuit to output the three-phase short-circuit signal as appropriate. If an anomaly is detected in the three-phase short-circuiting, the control circuit notifies, for example, an upstream controller of the vehicle of the anomaly detected, and the upstream controller issues a warning to the driver to prompt for a repair through meter display or the like. This way, it is possible to take measures including giving guidance so that the driver can ensure a higher level of safety. As described, with the vehicle driving device having the above configuration, it is possible to promptly discover latent malfunctions of the three-phase short-circuit control in the inverter, and increase reliability of the vehicle driving device.

The overvoltage detection circuit may include: a first voltage dividing circuit which obtains a first divided voltage through voltage division by performing resistance division on the DC voltage; a second voltage dividing circuit which obtains a second divided voltage through voltage division by performing resistance division on a predetermined voltage, the second divided voltage being detected as the predetermined overvoltage; a selection circuit which selects and outputs one of the first divided voltage and the second divided voltage; and a comparison circuit which compares a reference voltage with the one of the first divided voltage and the second divided voltage outputted from the selection circuit, and outputs the three-phase short-circuit signal based on a comparison result, and the control circuit may force the overvoltage detection circuit to output the three-phase short-circuit signal by causing the selection circuit to output the second divided voltage when the permanent magnet motor is in motion under a predetermined condition.

With the vehicle driving device having the above configuration, the control circuit can force the overvoltage detection circuit to output the three-phase short-circuit signal by causing the selection circuit to select and output the second divided voltage. Accordingly, with the vehicle driving device having the above configuration, it is possible to promptly discover latent malfunctions of the three-phase short-circuit control in the inverter, and increase reliability of the vehicle driving device.

The one of the first divided voltage and the second divided voltage outputted from the selection circuit and the three-phase short-circuit signal outputted from the comparison circuit may be inputted to the control circuit, and the control circuit may determine that the second voltage dividing circuit and the selection circuit are functioning properly when the second divided voltage is a predetermined voltage, and determine that the overvoltage detection circuit is functioning properly when the three-phase short-circuit signal is a predetermined signal.

With the vehicle driving device having the above configuration, it is possible to determine that the second voltage dividing circuit and the selection circuit are functioning properly, and determine that the overvoltage detection circuit is functioning properly. Accordingly, with the vehicle driving device having the above configuration, when an anomaly is detected in the three-phase short-circuiting, it is possible to more precisely identify the circuit causing the anomaly. As described, with the vehicle driving device having the above configuration, it is possible to promptly discover latent malfunctions of the three-phase short-circuit control in the inverter, and increase reliability of the vehicle driving device.

After an anomaly is detected in the three-phase short-circuiting, the control circuit may inhibit the three-phase short-circuiting performed using the three-phase short circuit, and the microprocessor may cause the three-phase bridge circuit to perform the three-phase short-circuiting without using the three-phase short circuit.

With the vehicle driving device having the above configuration, after an anomaly is detected in the three-phase short-circuiting, the three-phase short-circuiting performed using the three-phase short circuit which may be causing the anomaly is inhibited, and the three-phase short-circuiting is performed without using the three-phase short circuit. Accordingly, with the vehicle driving device having the above configuration, it is possible to promptly discover latent malfunctions of the three-phase short-circuit control in the inverter, and increase reliability of the vehicle driving device.

Hereinafter, exemplary embodiments will be described in detail with reference to the drawings.

Note that each of the following exemplary embodiments illustrates a specific example of the present disclosure. The numerical values, shapes, materials, constituent elements, the arrangement and connection of the constituent elements, steps, the processing order of the steps, etc. illustrated in the following exemplary embodiments are mere examples, and are therefore not intended to limit the present disclosure. Among constituent elements in the exemplary embodiments described below, those not recited in any one of the independent claims each representing an implementation embodiment according to an aspect of the present disclosure will be described as optional elements. Implementation embodiments according to the present disclosure are not limited to the existing independent claims, and may also be represented by other independent claims.

Note that the drawings are represented schematically and are not necessarily precise illustrations. Furthermore, throughout the figures, the same reference signs are given to essentially the same constituent elements, and redundant descriptions may be omitted or simplified.

States of a permanent magnet motor of a vehicle driving device are roughly divided into an exerting state, a regeneration state, a stop state, and a state which is neither the exerting state, the regeneration state, nor the stop state (i.e., a state in which the vehicle is coasting and, when the vehicle has another driving source such as an engine or another permanent magnet motor, a state in which the vehicle is traveling with another driving source only). The exemplary embodiments described below illustrate, as a typical example, the case of performing the three-phase short-circuit control when the permanent magnet motor is in neither the exerting state, the regeneration state, nor the stop state, and when the permanent magnet motor is in a state of regenerating at a small torque less than or equal to a predetermined torque. The present disclosure, however, is not limited to this example, and is also applicable to a state in which the permanent magnet motor is exerting, regenerating, or stopped under a predetermined condition.

Embodiment 1

[1-1. Configuration of Vehicle Driving Device]

First, a configuration of a vehicle driving device according to the present embodiment will be described with reference to FIG. 1 to FIG. 3.

FIG. 1 is a schematic view illustrating an example of electric vehicle 1 which includes vehicle driving device 5 according to Embodiment 1. Electric vehicle 1 includes driven wheels 2, power transmission mechanism 3, permanent magnet motor M1, inverter 10, and battery P1. Among these elements, permanent magnet motor M1, inverter 10, and battery P1 constitute vehicle driving device 5. Hereinafter, permanent magnet motor M1 is also referred to as motor M1.

Motor M1 is a three-phase alternating current (AC) motor which drives driven wheels 2 of electric vehicle 1, and is, for example, an interior magnet synchronous motor or a surface magnet synchronous motor.

Power transmission mechanism 3 includes, for example, a differential gear and a drive shaft, and transfers power between motor M1 and driven wheels 2. The torque of motor M1 is transferred to driven wheels 2 via power transmission mechanism 3. Similarly, the torque of driven wheels 2 is transferred to motor M1 via power transmission mechanism 3. Note that electric vehicle 1 need not include power transmission mechanism 3, and motor M1 and driven wheels 2 may be directly coupled.

Battery P1 is, for example, a direct current (DC) power supply such as a lithium ion battery. Battery P1 supplies and stores power for driving motor M1.

Inverter 10 converts DC power supplied from battery P1 into three-phase AC power, for example, and supplies the AC power to motor M1. In such a manner, vehicle driving device 5 is configured to drive three-phase AC motor M1 using power from battery P1.

Figure 2:
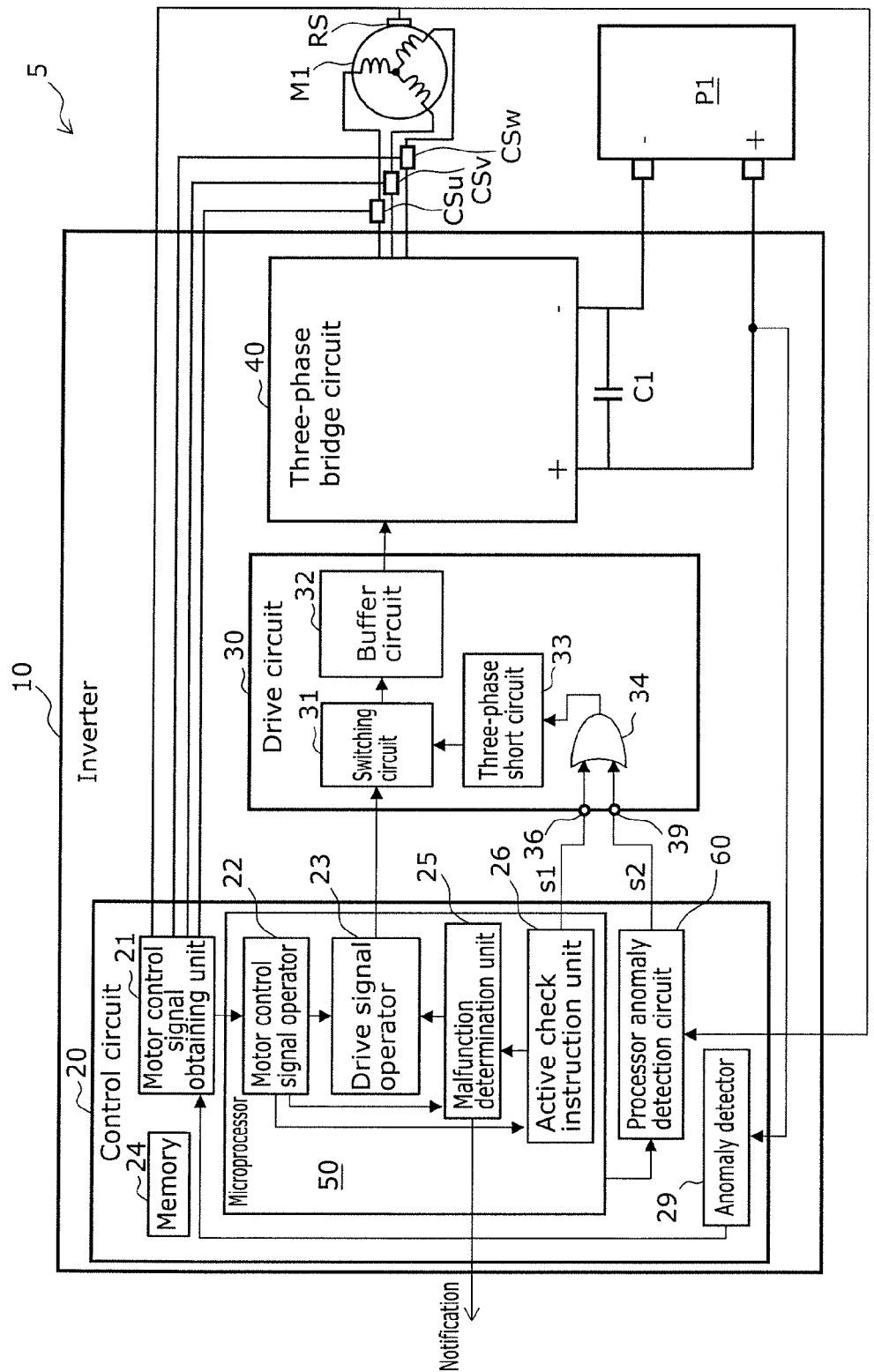
FIG. 2 is a circuit diagram illustrating an example of an inverter, a permanent magnet motor, and a battery included in the vehicle driving device according to Embodiment 1.

FIG. 2 is a circuit diagram illustrating an example of inverter 10, permanent magnet motor M1, and battery P1 included in vehicle driving device 5.

As illustrated in FIG. 2, vehicle driving device 5 includes motor M1, inverter 10, and battery P1. Inverter 10 includes three-phase bridge circuit 40, drive circuit 30, and control circuit 20. Note that FIG. 2 also illustrates smoothing capacitor C1 which smoothes voltage applied to three-phase bridge circuit 40.

Three-phase bridge circuit 40 converts the DC power supplied from battery P1 into three-phase AC power through switching operations, and supplies the AC power to motor M1, and drives motor M1. The input end of three-phase bridge circuit 40 for switching operation control is connected to drive circuit 30, the power input end of three-phase bridge circuit 40 is connected to battery P1, and the output end of three-phase bridge circuit 40 is connected to motor M1. Note that at the time of regeneration of motor M1, regenerative current is introduced from the output end of three-phase bridge circuit 40 and flows toward the power input end, but here, the input end is defined as the end connected to battery P1 and the output end as the end connected to motor M1.

Figure 3:
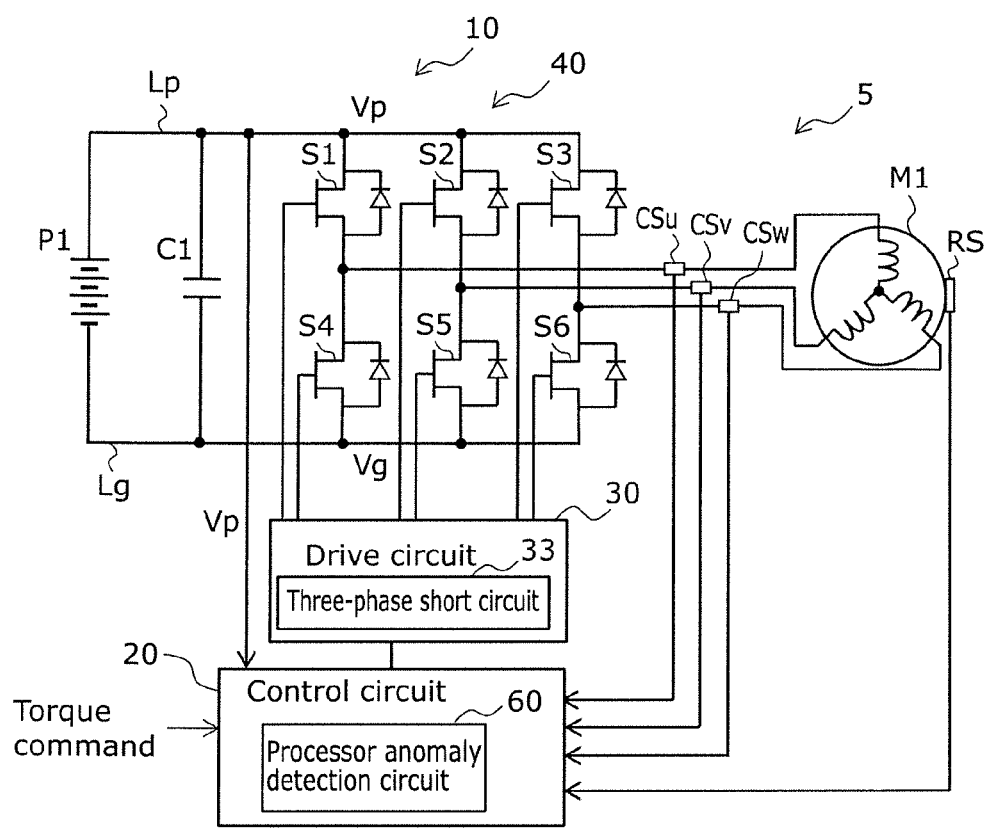
FIG. 3 is a circuit diagram illustrating an example of a three-phase bridge circuit included in the inverter of the vehicle driving device according to Embodiment 1.

FIG. 3 is a circuit diagram illustrating an example of three-phase bridge circuit 40 included in inverter 10 of vehicle driving device 5. Note that in FIG. 3, voltage Vp is a power supply voltage, and voltage Vg is a ground voltage.

Three-phase bridge circuit 40 includes: switching elements S1, S2, and S3 provided in an upper arm group located at the upper side of FIG. 3; and switching elements S4, S5, and S6 provided in a lower arm group located at the lower side of FIG. 3. For example, switching elements S1 to S6 are configured as field-effect transistors (FETs) or insulated-gate bipolar transistors (IGBTs), for example. Switching elements S1 to S6 may be configured using wide-bandgap semiconductors.

Switching elements S1, S2, and S3 are respectively connected between three output lines extending from the three terminals of motor M1 and power supply line Lp connected to the positive electrode of battery P1. Switching elements S4, S5, and S6 are respectively connected between the three output lines and ground line Lg connected to the negative electrode of battery P1. A freewheel diode is connected in parallel to each of switching elements S1 to S6. The freewheel diodes may be parasitic diodes that are parasitic to switching elements S1 to S6.

Switching elements S1 to S6 are connected to drive circuit 30 and are driven by a signal outputted from drive circuit 30.

Motor M1 is driven in exerting, regeneration, coasting, and stop states based on the driving of switching elements S1 to S6.

[1-2. Configurations of Control Circuit and Drive Circuit]

Next, configurations of control circuit 20 and drive circuit 30 will be described with reference to FIG. 2 to FIG. 5.

As illustrated in FIG. 2, control circuit 20 includes microprocessor 50 which performs various computations etc., memory 24, anomaly detector 29 which detects an anomaly in voltage, and processor anomaly detection circuit 60. Note that control circuit 20 also includes motor control signal obtaining unit 21 which will be described later.

Anomaly detector 29 detects an anomaly such as overvoltage generated in inverter 10, and is connected to power supply line Lp of three-phase bridge circuit 40 located at the positive side of battery P1.

Memory 24 is a storage element which stores, for example, program software or information used for causing microprocessor 50 to operate.

Microprocessor 50 is a circuit which performs three-phase PWM control or three-phase short-circuit control on three-phase bridge circuit 40 via drive circuit 30.

The three-phase short-circuit control is to place the three phases of motor M1 illustrated in FIG. 3 in a short-circuit state and eliminate voltage induced from winding coils of motor M1. Specifically, the three-phase short-circuit control is implemented by short-circuiting each switching element of one arm group, and releasing each switching element of the other arm group, among switching elements S1 to S3 of the upper arm group and switching elements S4 to S6 of the lower arm group of three-phase bridge circuit 40.

With vehicle driving device 5 according to the present embodiment, when anomaly detector 29 detects an anomaly such as overvoltage, overvoltage generated in inverter 10 is inhibited by performing the three-phase short-circuit control using program software of microprocessor 50.

Vehicle driving device 5 according to the present embodiment includes processor anomaly detection circuit 60 and three-phase short circuit 33 to be able to perform the three-phase short-circuit control even when microprocessor 50 is malfunctioning. Processor anomaly detection circuit 60 is provided in, for example, control circuit 20, and three-phase short circuit 33 is provided in, for example, drive circuit 30 (see FIG. 2 and FIG. 3).

Three-phase short circuit 33 is a hardware circuit for short-circuiting each of the three phases of motor M1. Specifically, three-phase short circuit 33 performs the three-phase short-circuit control by short-circuiting each switching element of one arm group of three-phase bridge circuit 40, and releasing each switching element of the other arm group of three-phase bridge circuit 40. The three-phase short-circuit control by three-phase short circuit 33 enables elimination of voltage induced from the winding coils of motor M1. Since vehicle driving device 5 includes three-phase short circuit 33, even when, for example, microprocessor 50 is malfunctioning and the three-phase short-circuit control cannot be performed using program software, it is possible to inhibit overvoltage on three-phase bridge circuit 40 by causing three-phase short circuit 33 to perform the three-phase short-circuit control. Note that a malfunction in microprocessor 50 is, for example, a bug in program software of microprocessor 50 or program software partially running out of control.

Figure 4:
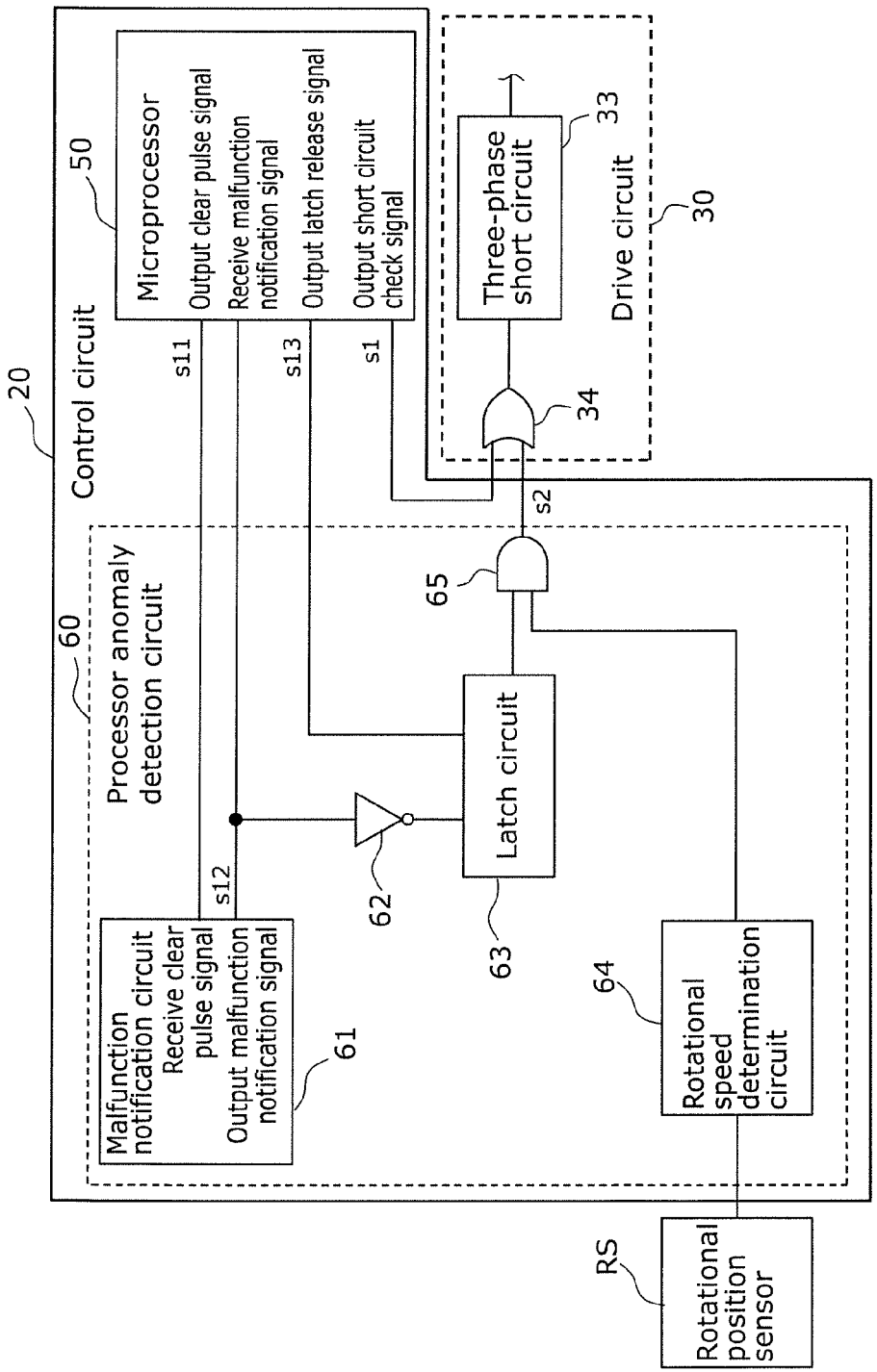
FIG. 4 is a circuit diagram illustrating an example of a processor anomaly detection circuit included in a control circuit of a vehicle driving device according to Embodiment 1.

FIG. 4 is a circuit diagram illustrating an example of processor anomaly detection circuit 60 included in control circuit 20.

Processor anomaly detection circuit 60 detects an anomaly in microprocessor 50, and outputs three-phase short-circuit drive signal s2 for driving three-phase short circuit 33. Processor anomaly detection circuit 60 includes malfunction notification circuit 61, latch circuit 63, rotational speed determination circuit 64, and logic circuits 62 and 65.

In FIG. 4, microprocessor 50 outputs clear pulse signal s11 to malfunction notification circuit 61 on a regular basis.

Malfunction notification circuit 61 monitors whether or not microprocessor 50 is malfunctioning. Malfunction notification circuit 61 is, for example, a watchdog timer circuit. When malfunction notification circuit 61 does not receive clear pulse signal s11 for a predetermined period, it is assumed that microprocessor 50 is malfunctioning, and malfunction notification circuit 61 outputs malfunction notification signal s12 to latch circuit 63 and microprocessor 50.

Malfunction notification signal s12 is a reset signal, and is outputted as a pulse signal whose signal level is a low level. The pulse signal whose signal level is a low level is inverted by logic circuit 62 which is a NOT circuit, and outputted to latch circuit 63 as a pulse signal whose signal level is a high level.

Latch circuit 63 holds malfunction notification signal s12 outputted from malfunction notification circuit 61, and outputs malfunction notification signal s12 to logic circuit 65 which is an AND circuit. For example, when microprocessor 50 is malfunctioning and, in addition, overvoltage is generated in inverter 10, it is not possible to perform the three-phase short-circuit control using program software. In contrast, in the present embodiment, even when microprocessor 50 is malfunctioning, it is possible to perform the three-phase short-circuit control at appropriate timing based on malfunction notification signal s12 held by latch circuit 63.

Note that microprocessor 50 restarts upon receiving the reset signal that is malfunction notification signal s12. When microprocessor 50 has succeeded in restarting properly based on the reset signal, microprocessor 50 outputs, to latch circuit 63, latch release signal s13 which releases the signal held by latch circuit 63. When microprocessor 50 properly restarts, vehicle driving device 5 is restored to the normal operation; however, when microprocessor 50 fails to properly restart, malfunction notification signal s12 continues to be outputted to logic circuit 65.

Rotational speed determination circuit 64 determines whether or not the rotational speed of motor M1 is greater than or equal to a predetermined rotational speed. When the rotational speed of motor M1 is greater than or equal to the predetermined rotational speed, rotational speed determination circuit 64 outputs, to logic circuit 65, a signal whose signal level is a high level. The reason why rotational speed determination circuit 64 determines whether or not the rotational speed of motor M1 is greater than or equal to the predetermined rotational speed is because when motor M1 rotates at low speed, induced voltage is not likely to be generated and the necessity for the three-phase short-circuit control is small. Furthermore, since the three-phase short-circuit control produces braking torque, the three-phase short-circuit control is undesired when motor M1 rotates at low speed.

Figure 5:
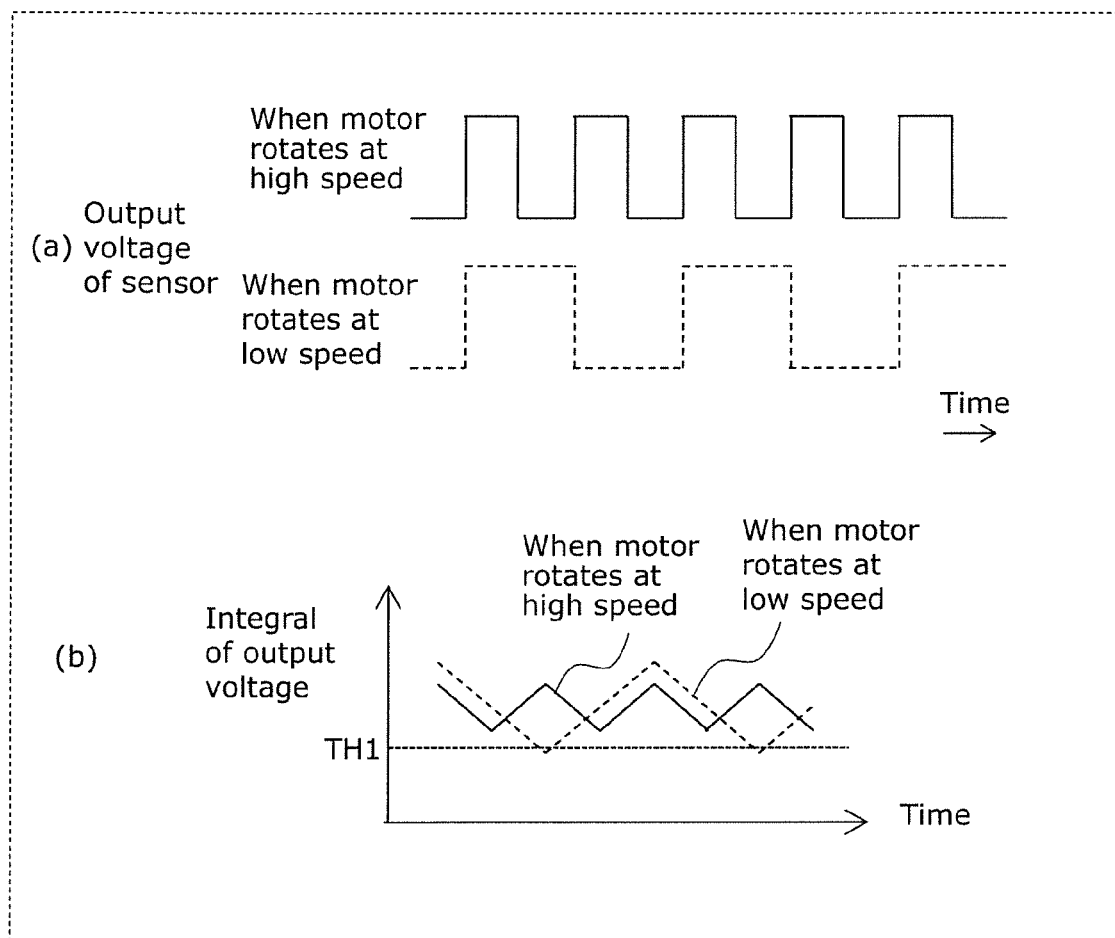
FIG. 5 illustrates an output voltage of a rotational position sensor provided to a permanent magnet motor included in the vehicle driving device according to Embodiment 1.

FIG. 5 illustrates an output voltage of rotational position sensor RS provided to permanent magnet motor M1 included in vehicle driving device 5. Rotational position sensor RS is, for example, a hall element. Part (a) of FIG. 5 illustrates a change over time of an output voltage which is outputted from the hall element, and part (b) of FIG. 5 illustrates the integral of the output voltage. Note that the integral of the output voltage is determined by passing the output voltage through a CR filter.

As illustrated in part (a) of FIG. 5, when motor M1 rotates at high speed, the cycle of the signal of the output voltage is shorter and the pulse width is narrower than when motor M1 rotates at low speed. As illustrated in part (b) of FIG. 5, when motor M1 rotates at high speed, the cycle of the signal of the output voltage is shorter and the amplitude is smaller than when motor M1 rotates at low speed.

In the present embodiment, threshold TH1 is provided for the integral of the output voltage as illustrated in part (b) of FIG. 5. When the integral of the output voltage of rotational position sensor RS is not below threshold TH1, rotational speed determination circuit 64 determines that the rotational speed of motor M1 is greater than or equal to the predetermined rotational speed, and outputs, to logic circuit 65, a signal whose signal level is a high level.

In the case of receiving a signal from both of latch circuit 63 and rotational speed determination circuit 64, logic circuit 65 outputs three-phase short-circuit drive signal s2.

Three-phase short-circuit drive signal s2 is outputted to three-phase short circuit 33 via OR circuit 34. This causes three-phase short circuit 33 to perform the three-phase short-circuit control, and thus, even if microprocessor 50 is malfunctioning, it is possible to perform the three-phase short-circuit control when motor M1 rotates at high speed. This makes it possible to inhibit overvoltage on inverter 10.

The following continues to describe the configuration of drive circuit 30. Note that the following also describes examination of three-phase short circuit 33 for malfunctions.

Drive circuit 30 drives switching elements S1 to S6 of three-phase bridge circuit 40 in order to perform the three-phase PWM control and the three-phase short-circuit control described above. The input end of drive circuit 30 is connected to control circuit 20, and the output end of drive circuit 30 is connected to three-phase bridge circuit 40.

As illustrated in FIG. 2, drive circuit 30 includes switching circuit 31, buffer circuit 32, three-phase short circuit 33, and OR circuit 34. Drive circuit 30 also includes drive signal reception terminal 39 and check terminal 36.

Drive signal reception terminal 39 receives three-phase short-circuit drive signal s2 described above. Three-phase short-circuit drive signal s2 is outputted to drive circuit 30 from processor anomaly detection circuit 60.

Check terminal 36 receives short circuit check signal s1 for three-phase short circuit 33 to perform the three-phase short-circuit control. Short circuit check signal s1 is outputted to drive circuit 30 from control circuit 20. In the following description, a first active check refers to testing of the three-phase short-circuit control by three-phase short circuit 33 and checking whether or not three-phase short circuit 33 can perform the three-phase short-circuit control. By performing the first active check, it is possible to examine three-phase short circuit 33 for malfunctions.

Each signal inputted to drive signal reception terminal 39 and check terminal 36 is inputted to OR circuit 34. OR circuit 34 outputs a signal to the three-phase short circuit 33 when at least one of drive signal reception terminal 39 and check terminal 36 receives a signal. Three-phase short circuit 33 is driven based on the signal outputted from OR circuit 34.

Switching circuit 31 switches whether to drive three-phase bridge circuit 40 based on a drive signal outputted from drive signal operator 23, which will be described later, or drive three-phase bridge circuit 40 using a signal outputted from three-phase short circuit 33. Note that the drive signal outputted from drive signal operator 23 includes various signals for performing the three-phase PWM control or the three-phase short-circuit control on three-phase bridge circuit 40. The switching by switching circuit 31 is implemented by, for example, a hard logic circuit. Switching circuit 31 according to the present embodiment switches the switching control and the like performed in motor M1 to the three-phase short-circuit control performed by three-phase short circuit 33, when drive circuit 30 receives short circuit check signal s1 or three-phase short-circuit drive signal s2.

Buffer circuit 32 amplifies an output signal which is to be outputted to three-phase bridge circuit 40, to be able to drive switching elements S1 to S6. By buffer circuit 32 amplifying the output signal, it becomes possible to drive three-phase bridge circuit 40.

Next, a configuration of control circuit 20 and a configuration of microprocessor 50 will be described. The following also describes active check instruction unit 26 and malfunction determination unit 25 which examine three-phase short circuit 33 for malfunctions.

Control circuit 20 includes motor control signal obtaining unit 21 in addition to above-described microprocessor 50, memory 24, anomaly detector 29, and processor anomaly detection circuit 60. Microprocessor 50 includes motor control signal operator 22, drive signal operator 23, malfunction determination unit 25, and active check instruction unit 26.

Motor control signal obtaining unit 21 obtains information detected by various sensors such as current sensors CSu, CSv, and CSw that detect current flowing through motor M1, and rotational position sensor RS that detects a rotational position by detecting magnetic pole positions of motor M1. Note that current sensors CSu, CSv, and CSw detect current values in phase u, phase v, and phase w of motor M1. Motor control signal obtaining unit 21 obtains information on voltage Vp at power supply line Lp. Motor control signal obtaining unit 21 obtains control command information, such as a torque command, outputted from the outside of control circuit 20, for example an electronic control unit (ECU) of electric vehicle 1.

Motor control signal operator 22 performs a computation to convert a torque command value into a current based on the above information obtained by motor control signal obtaining unit 21, and outputs a control signal for controlling the current in motor M1. For example, motor control signal operator 22 outputs the control signal for controlling the current in motor M1 so that the torque of motor M1 at the time when vehicle driving device 5 is driving motor M1 becomes a target torque (for instance, a torque in accordance with an operating amount of an accelerator pedal or a brake pedal of electric vehicle 1) indicated by the torque command information.

Motor control signal operator 22 performs a computation to convert the above information obtained by motor control signal obtaining unit 21 into a control signal for examining three-phase short circuit 33 and the like for malfunctions, and outputs the control signal. For example, motor control signal operator 22 converts the control command information, such as the torque command, into the above control signal, and outputs the control signal to drive signal operator 23, malfunction determination unit 25, and active check instruction unit 26. Motor control signal operator 22 converts information, such as the current flowing through motor M1, the rotational positions of the magnetic poles of motor M1, and voltage Vp at power supply line Lp, into the control signal, and outputs the control signal to drive signal operator 23 and malfunction determination unit 25.

Drive signal operator 23 calculates a drive signal necessary for driving motor M1, based on the control signal outputted from motor control signal operator 22, and outputs the drive signal to drive circuit 30. When vehicle driving device 5 is operating normally, drive signal operator 23 outputs a drive signal for performing the three-phase PWM control.

When an anomaly is detected in inverter 10, drive signal operator 23 outputs a drive signal for performing the three-phase short-circuit control using the program software stored in memory 24. Specifically, drive signal operator 23 changes the drive signal for the three-phase PWM control to the drive signal for the three-phase short-circuit control, and outputs the drive signal for the three-phase short-circuit control to drive circuit 30.

In such a manner, drive signal operator 23 outputs, to drive circuit 30, the drive signal for performing the three-phase PWM control and the drive signal for performing the three-phase short-circuit control. Of the drive signal outputted from drive signal operator 23 and the signal outputted from three-phase short circuit 33, drive circuit 30 preferentially outputs, to three-phase bridge circuit 40, the signal outputted from three-phase short circuit 33. Three-phase bridge circuit 40 drives motor M1 based on the signal outputted from drive circuit 30.

Active check instruction unit 26 is a circuit which outputs above-described short circuit check signal s1 to check terminal 36. Active check instruction unit 26 determines, based on the above control signal outputted from motor control signal operator 22, whether or not performing the first active check at this timing affects the driving of vehicle driving device 5.

Active check instruction unit 26, for example, determines to perform the first active check and outputs short circuit check signal s1 to check terminal 36 when the torque of motor M1 in the case of performing the three-phase short-circuit control is less than or equal to a torque which does not affect the driving of vehicle driving device 5. Whether or not to perform the first active check is determined at regular time intervals. Note that the determination as to whether or not to perform the first active check is not necessarily performed by active check instruction unit 26, and may be performed by a circuit different from active check instruction unit 26, so long as it is a circuit included in control circuit 20.

Active check instruction unit 26 outputs short circuit check signal s1, and at the same time, outputs a busy signal to malfunction determination unit 25 indicating that three-phase short circuit 33 is currently being checked.

Malfunction determination unit 25 determines whether or not three-phase short circuit 33 is malfunctioning. Malfunction determination unit 25 obtains information on at least one of (i) a change in the current flowing through the three phases of motor M1, (ii) a change in a current phase, and (iii) a change in a DC voltage at three-phase bridge circuit 40, which occur when the three-phase short-circuit control is performed. A change in the current can be calculated based on the current values detected by current sensors CSu, CSv, and CSw. A change in the current phase can be calculated based on, for example, a d-axis current and a q-axis current of motor M1. The d-axis current and the q-axis current can be calculated based on the current values detected by current sensors CSu, CSv, and CSw, and the rotational positions of the magnetic poles detected by rotational position sensor RS. A change in the DC voltage can be calculated by detecting voltage Vp at power supply line Lp.

Malfunction determination unit 25 determines whether or not three-phase short circuit 33 is malfunctioning based on the above information obtained. For example, malfunction determination unit 25 determines that three-phase short circuit 33 is malfunctioning when at least one of the current, the current phase, and the DC voltage is outside a specified range. When determining that three-phase short circuit 33 is malfunctioning, malfunction determination unit 25 outputs a notification signal that notifies an external device of malfunction information.

Since control circuit 20 includes active check instruction unit 26 and malfunction determination unit 25 as described above, it is possible to determine whether or not three-phase short circuit 33 is malfunctioning. This makes it possible to promptly discover latent malfunctions of three-phase short circuit 33, and increase reliability of vehicle driving device 5.

[1-3. Operation of Vehicle Driving Device]

Next, an operation of vehicle driving device 5 according to Embodiment 1 will be described with reference to FIG. 6.

Figure 6:
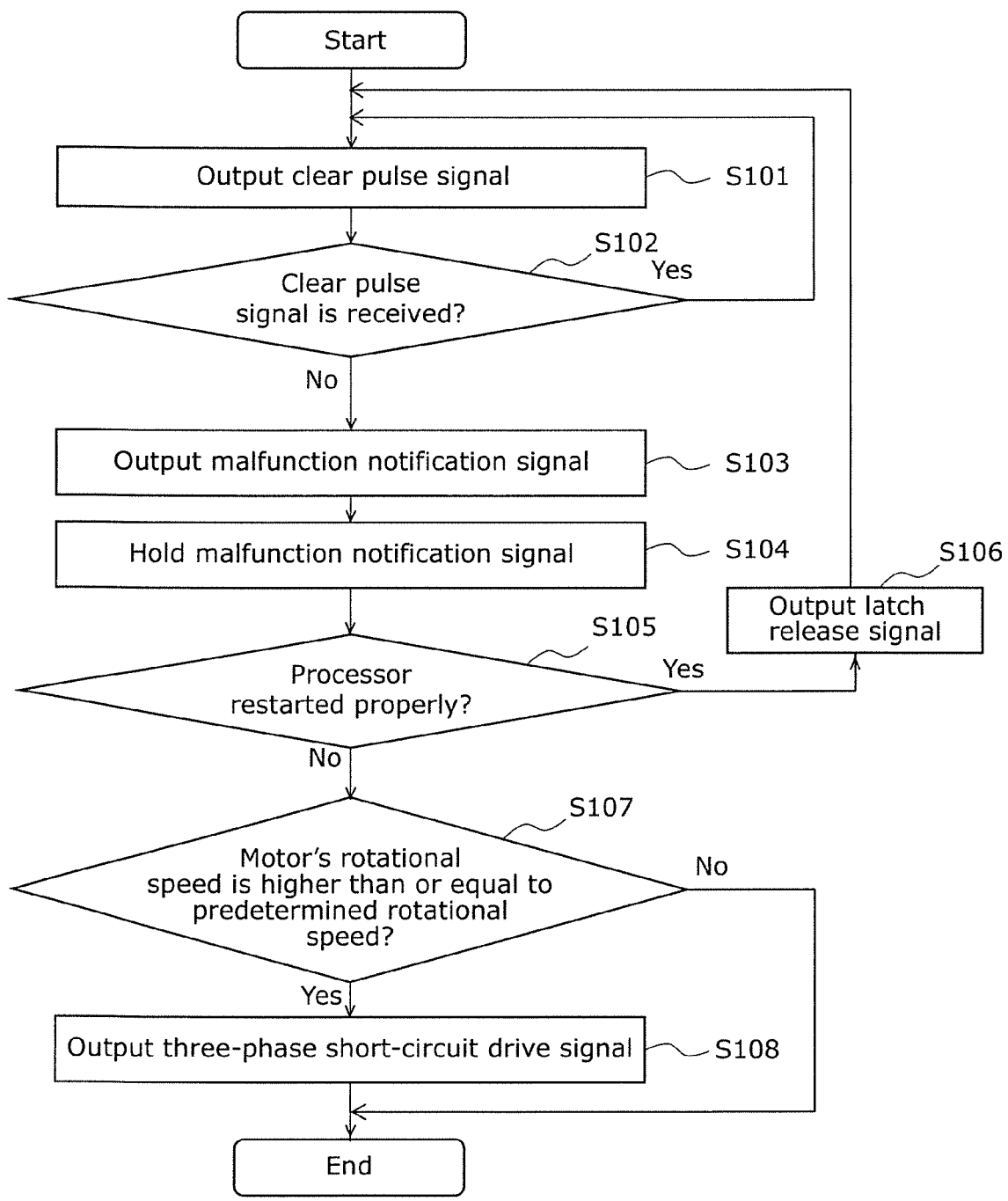
FIG. 6 is a flow chart illustrating an example of an operation of the vehicle driving device according to Embodiment 1.

FIG. 6 is a flow chart illustrating an example of an operation of vehicle driving device 5 according to Embodiment 1.

Microprocessor 50 outputs clear pulse signal s11 to malfunction notification circuit 61 on a regular basis (Step S101). Malfunction notification circuit 61 is, for example, a watchdog timer circuit which notifies whether or not microprocessor 50 is malfunctioning.

Malfunction notification circuit 61 determines whether or not clear pulse signal s11 is received on a regular basis (Step S102). When malfunction notification circuit 61 receives clear pulse signal s11 on a regular basis (Yes in Step S102), it means that microprocessor 50 is not malfunctioning, and thus, the processing returns to Step S101. When malfunction notification circuit 61 does not receive clear pulse signal s11 on a regular basis (No in Step S102), it is assumed that microprocessor 50 is malfunctioning, and malfunction notification circuit 61 outputs malfunction notification signal s12 to latch circuit 63 and microprocessor 50 (Step S103). Malfunction notification signal s12 is also a reset signal for the watchdog timer circuit.

Latch circuit 63 receives and holds malfunction notification signal s12 (Step S104).

Microprocessor 50 restarts upon receiving malfunction notification signal s12, and determines whether or not microprocessor 50 has succeeded in restarting properly (Step S105). When microprocessor 50 has succeeded in restarting properly (Yes in Step S105), microprocessor 50 outputs latch release signal s13 to latch circuit 63 (Step S106) to release the holding of malfunction notification signal s12 by latch circuit 63. When microprocessor 50 has failed to restart properly (No in S105), the state in Step S104 is maintained, and the processing proceeds to the next step.

In the next step, rotational speed determination circuit 64 determines whether or not the rotational speed of motor M1 is greater than or equal to a predetermined rotational speed (Step S107). When the rotational speed of motor M1 is not greater than or equal to the predetermined rotational speed (No in Step S107), induced voltage generated in motor M1 is not so high as to cause a breakdown of switching elements S1 to S6 of inverter 10, and there is no necessity to perform the three-phase short-circuit control. Thus, the flow chart in FIG. 6 is ended. When the rotational speed of motor M1 is greater than or equal to the predetermined rotational speed (Yes in Step S107), there is a possibility that induced voltage so high as to cause a breakdown of switching elements S1 to S6 will be generated in motor M1, and thus, control circuit 20 performs the three-phase short-circuit control using three-phase short circuit 33 (Step S108). Specifically, control circuit 20 outputs three-phase short-circuit drive signal s2 to drive circuit 30 to drive three-phase short circuit 33.

By repeating these steps, it is possible to perform the three-phase short-circuit control when motor M1 rotates at high speed, even if microprocessor 50 is malfunctioning. This makes it possible to inhibit overvoltage on inverter 10, and increase reliability of vehicle driving device 5.

Embodiment 2

[2-1. Configuration of Processor Anomaly Detection Circuit of Vehicle Driving Device]

Next, processor anomaly detection circuit 60A of vehicle driving device 5 according to Embodiment 2 will be described. Embodiment 2 illustrates an example in which malfunction simulation examination is performed on latch circuit 63 and three-phase short circuit 33 using microprocessor 50. The malfunction simulation examination is a second active check performed to promptly discover latent malfunctions of latch circuit 63 and three-phase short circuit 33.

Figure 7:
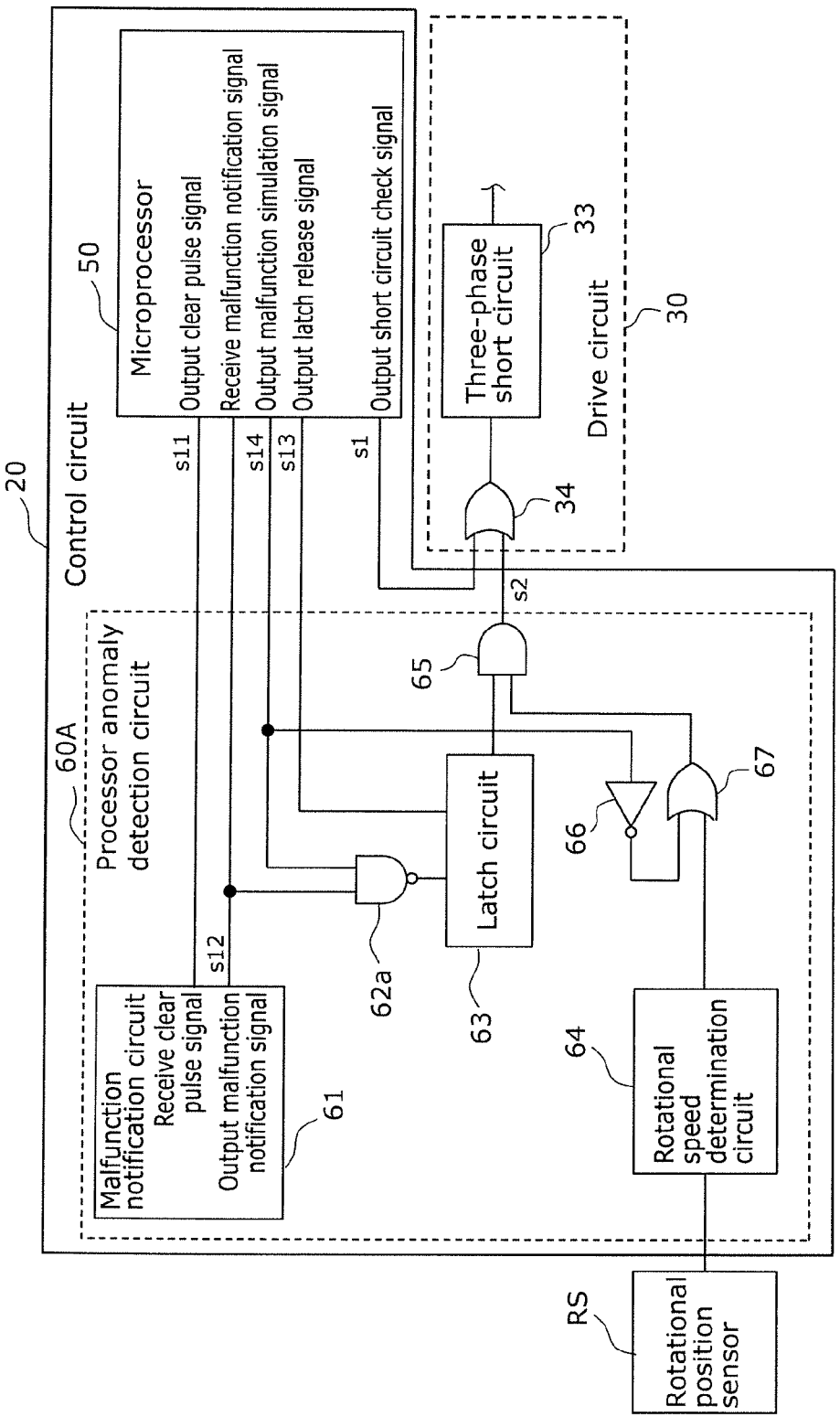
FIG. 7 is a circuit diagram illustrating an example of a processor anomaly detection circuit according to Embodiment 2.

FIG. 7 is a circuit diagram illustrating an example of processor anomaly detection circuit 60A according to Embodiment 2.

Processor anomaly detection circuit 60A detects an anomaly in microprocessor 50, and outputs three-phase short-circuit drive signal s2 to three-phase short circuit 33. Furthermore, processor anomaly detection circuit 60A performs malfunction simulation examination on, for example, latch circuit 63 and three-phase short circuit 33. The present embodiment describes the case of performing the malfunction simulation examination.

To perform malfunction simulation examination, processor anomaly detection circuit 60A includes latch circuit 63 and logic circuits 62a, 65, 66, and 67.

Processor anomaly detection circuit 60A illustrated in FIG. 7 is different from processor anomaly detection circuit 60 in Embodiment 1 in that logic circuit 62 illustrated in FIG. 4 has been replaced with logic circuit 62a which is an NAND circuit. Processor anomaly detection circuit 60A is also different from processor anomaly detection circuit 60 in Embodiment 1 in that logic circuit 67 is newly provided between rotational speed determination circuit 64 and logic circuit 65, and logic circuit 66 is newly provided between microprocessor 50 and logic circuit 67.

In FIG. 7, microprocessor 50 outputs malfunction simulation signal s14 which is a trigger for performing malfunction simulation examination. Malfunction simulation signal s14 is outputted as a pulse signal whose signal level is a low level, to logic circuit 62a which is an NAND circuit. Logic circuit 62a outputs a signal whose signal level is a high level to latch circuit 63 when the signal level of one of malfunction notification signal s12 and malfunction simulation signal s14 is a low level. Accordingly, when malfunction simulation signal s14 is outputted from microprocessor 50, latch circuit 63 holds malfunction simulation signal s14, and outputs malfunction simulation signal s14 to logic circuit 65.

In the meantime, malfunction simulation signal s14 is also outputted to logic circuit 66 which is a NOT circuit. Malfunction simulation signal s14 is inverted by logic circuit 66 and outputted as a signal whose signal level is a high level, to logic circuit 67 which is an OR circuit. The signal outputted to logic circuit 67 which is an OR circuit is inputted to logic circuit 65. The purpose of outputting malfunction simulation signal s14 also to logic circuit 67 is to increase examination opportunities by enabling malfunction simulation examination regardless of the rotational speed of motor M1.

Logic circuit 65 outputs three-phase short-circuit drive signal s2 upon receiving a signal from both of latch circuit 63 and logic circuit 67.

Three-phase short-circuit drive signal s2 is outputted to three-phase short circuit 33 via OR circuit 34. With this, the three-phase short-circuit control is performed by three-phase short circuit 33. Control circuit 20 obtains information on at least one of (i) a change in the current flowing through the three phases of motor M1, (ii) a change in a current phase, or (iii) a change in a DC voltage at three-phase bridge circuit 40, and determines, based on the information, whether or not three-phase short circuit 33 and latch circuit 63 are malfunctioning. The malfunction simulation examination makes it possible to promptly discover latent malfunctions of latch circuit 63 and three-phase short circuit 33, and increase reliability of vehicle driving device 5.

[2-2. Operation of Vehicle Driving Device]

Next, an operation of vehicle driving device 5 according to Embodiment 2 will be described.

Figure 8:
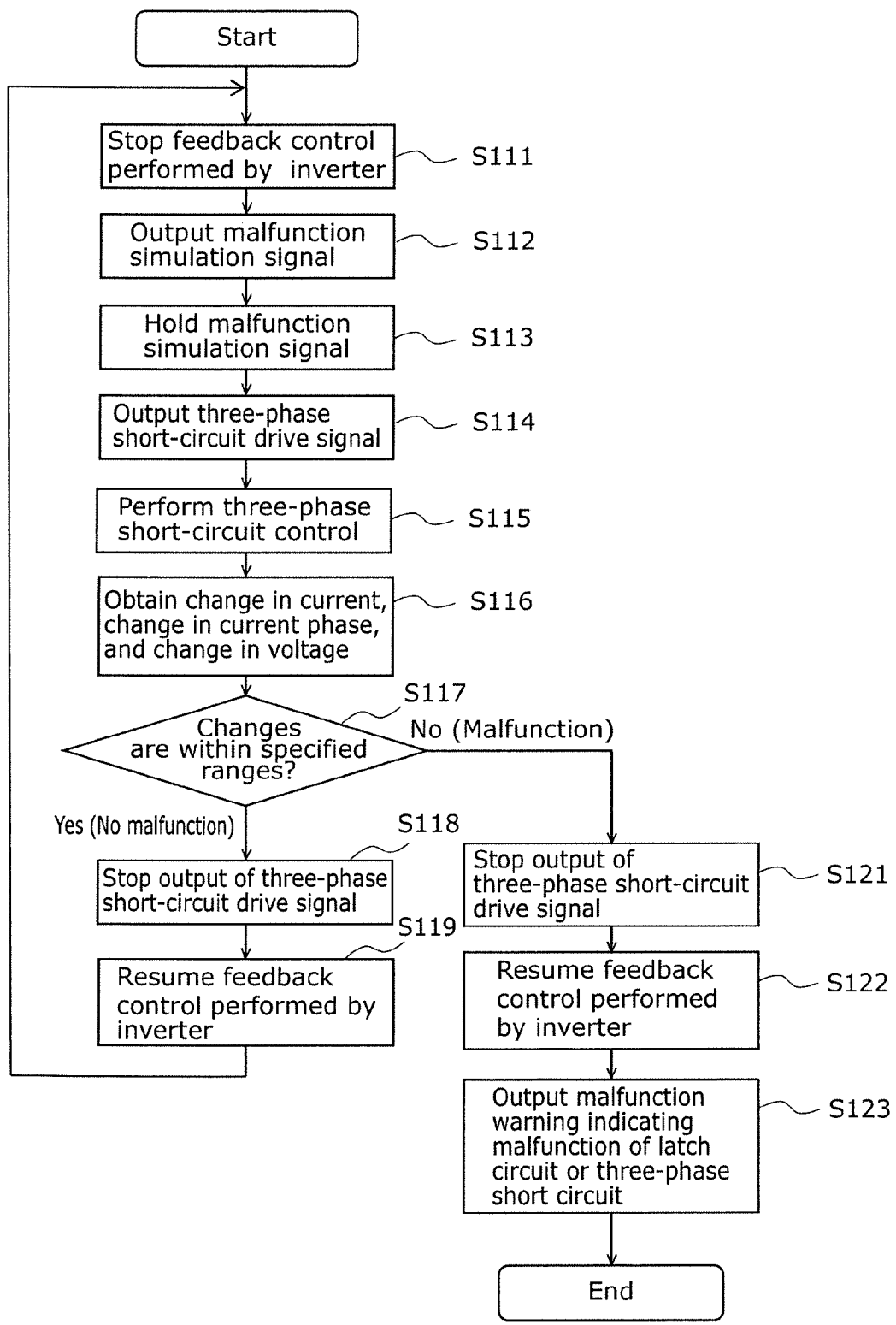
FIG. 8 is a flow chart illustrating an example of an operation of a vehicle driving device according to Embodiment 2.

FIG. 8 is a flow chart illustrating an example of an operation of vehicle driving device 5 according to Embodiment 2.

Control circuit 20 stops feedback control performed by inverter 10 (Step S111) and outputs malfunction simulation signal s14 (Step S112) so as to perform the malfunction simulation examination through the second active check.

Malfunction simulation signal s14 is held by latch circuit 63 (Step S113), and outputted to logic circuit 65 which is an AND circuit.

Malfunction simulation signal s14 is outputted also to logic circuit 65 via logic circuits 66 and 67 in order to artificially create a state in which motor M1 rotates at high speed. With this, three-phase short-circuit drive signal s2 is outputted from logic circuit 65 (Step S114). Three-phase short-circuit drive signal s2 is outputted to drive signal reception terminal 39 of drive circuit 30, and continues to be outputted until it is stopped in Step S118 or S121 which will be described later.

Next, inverter 10 performs the three-phase short-circuit control using three-phase short circuit 33 (Step S115). Drive signal reception terminal 39 which has received three-phase short-circuit drive signal s2 outputs the received signal to OR circuit 34, and OR circuit 34 outputs the received signal to three-phase short circuit 33. With this, three-phase short circuit 33 is test-driven. Here, switching circuit 31 switches the output signal of switching circuit 31 to the signal outputted from three-phase short circuit 33, rather than the drive signal outputted from drive signal operator 23. Then, the signal outputted from three-phase short circuit 33 is outputted to three-phase bridge circuit 40 via buffer circuit 32. With this, the three-phase short-circuit control using three-phase short circuit 33 is tested on three-phase bridge circuit 40.

Next, control circuit 20 obtains a change in current, a change in a current phase, and a change in voltage in vehicle driving device 5 (Step S116). Specifically, motor control signal obtaining unit 21 obtains information on, for example, current sensors CSu, CSv, and CSw, rotational position sensor RS, and voltage Vp at power supply line Lp. Motor control signal operator 22 converts the information into a control signal, and outputs the control signal to malfunction determination unit 25.

Next, control circuit 20 determines whether or not latch circuit 63 and three-phase short circuit 33 are malfunctioning based on whether or not the changes in current, current phase, and voltage are within specified ranges (Step S117). Specifically, malfunction determination unit 25 determines whether the change in the current is outside a specified range, whether the change in the current phase is outside a specified range, and whether the change in the DC voltage is outside a specified range.

When determining that the changes in the current, current phase, and voltage are all within the respective specified ranges (Yes in S117), malfunction determination unit 25 determines that latch circuit 63 and three-phase short circuit 33 are not malfunctioning and are functioning properly. At this time, control circuit 20 stops the output of three-phase short-circuit drive signal s2 by stopping the output of malfunction simulation signal s14 and outputting latch release signal s13 which releases the signal held by latch circuit 63 (Step S118). Control circuit 20 then resumes the feedback control performed by inverter 10 (Step S119), and returns to Step S111 to repeat the second active check. The second active check is repeatedly performed at predetermined time intervals.

On the other hand, when at least one of the changes in the current, current phase, and voltage is outside the specified range (No in S117), control circuit 20 determines that latch circuit 63 or three-phase short circuit 33 is malfunctioning. At this time, control circuit 20 performs an operation which is performed when latch circuit 63 or three-phase short circuit 33 is malfunctioning. Note that since the first active check described above enables examination on whether or not three-phase short circuit 33 is malfunctioning, use of both the first active check and the second active check enables examination on whether or not latch circuit 63 is malfunctioning.

Control circuit 20 stops the output of three-phase short-circuit drive signal s2 (Step S121), and resumes the feedback control performed by inverter 10 (Step S122).

Next, control circuit 20 outputs a malfunction warning indicating that latch circuit 63 or three-phase short circuit 33 is malfunctioning, to an external device such as the ECU (an upstream controller) of electric vehicle 1 (Step S123). A user may be notified of malfunction information by malfunction determination unit 25 displaying the malfunction information via a monitor or outputting a sound informing the malfunction information via a loudspeaker.

Embodiment 3

[3-1. Configuration of Vehicle Driving Device]

First, a configuration of a vehicle driving device according to Embodiment 3 will be described with reference to FIG. 11 to FIG. 16.

Figure 11:
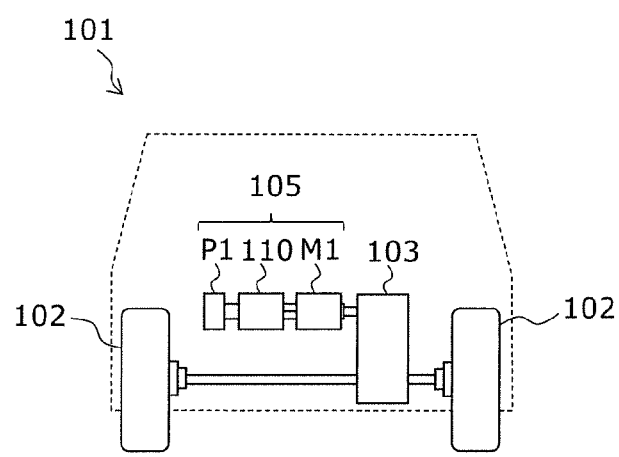
FIG. 11 is a schematic view illustrating an example of an electric vehicle including a vehicle driving device according to Embodiment 3.

FIG. 11 is a schematic view illustrating an example of electric vehicle 101 which includes vehicle driving device 105 according to Embodiment 3. Electric vehicle 101 includes driven wheels 102, power transmission mechanism 103, permanent magnet motor M1, inverter 110, and battery P1. Among these elements, permanent magnet motor M1, inverter 110, and battery P1 constitute vehicle driving device 105. Hereinafter, permanent magnet motor M1 is also referred to as motor M1.

Motor M1 is a three-phase AC motor which derives driven wheels 102 of electric vehicle 101, and is, for example, an interior magnet synchronous motor or a surface magnet synchronous motor.

Power transmission mechanism 103 includes, for example, a differential gear and a drive shaft, and transfers power between motor M1 and driven wheels 102. The torque of motor M1 is transferred to driven wheels 102 via power transmission mechanism 103. Similarly, the torque of driven wheels 102 is transferred to motor M1 via power transmission mechanism 103. Note that electric vehicle 101 need not include power transmission mechanism 103, and motor M1 and driven wheels 102 may be directly coupled.

Battery P1 is, for example, a DC power supply such as a lithium ion battery. Battery P1 supplies and stores power for driving motor M1.

Inverter 110 converts DC power supplied from battery P1 into, for example, three-phase AC power, and supplies the AC power to motor M1. In such a manner, vehicle driving device 105 is configured to drive three-phase AC motor M1 using power from battery P1.

Figure 12:
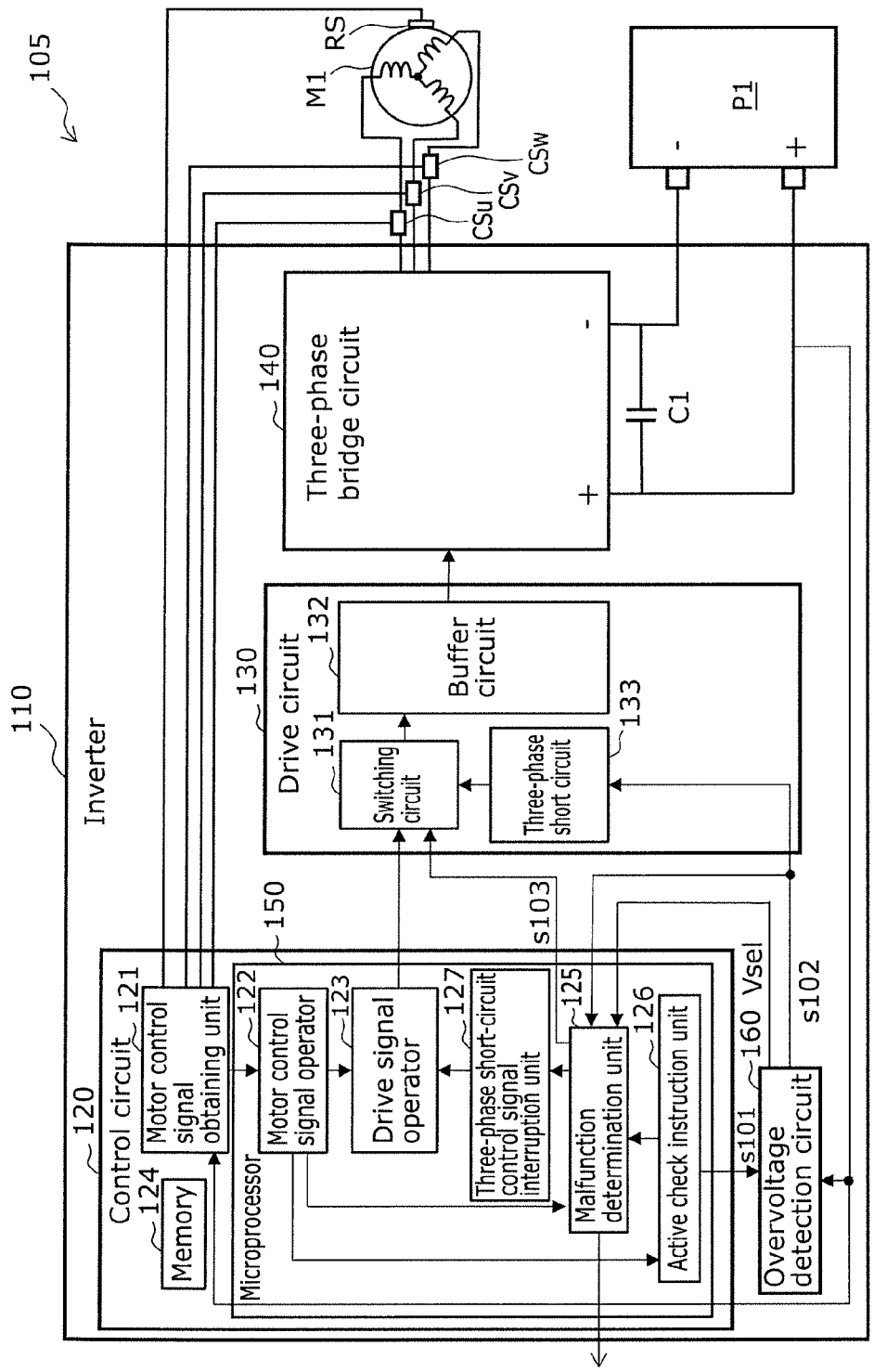
FIG. 12 is a circuit diagram illustrating an example of the vehicle driving device according to Embodiment 3.

FIG. 12 is a circuit diagram illustrating an example of vehicle driving device 105.

As illustrated in FIG. 12, vehicle driving device 105 includes motor M1, inverter 110, and battery P1. Inverter 110 includes three-phase bridge circuit 140, drive circuit 130, control circuit 120, and overvoltage detection circuit 160. Note that FIG. 12 also illustrates smoothing capacitor C1 which smoothes voltage applied to three-phase bridge circuit 140.

Three-phase bridge circuit 140 converts the DC power supplied from battery P1 into three-phase AC power through switching operations, and supplies the AC power to motor M1 to drive motor M1. The input end of three-phase bridge circuit 140 is connected to drive circuit 130, and the output end of three-phase bridge circuit 140 is connected to motor M1.

Figure 13:
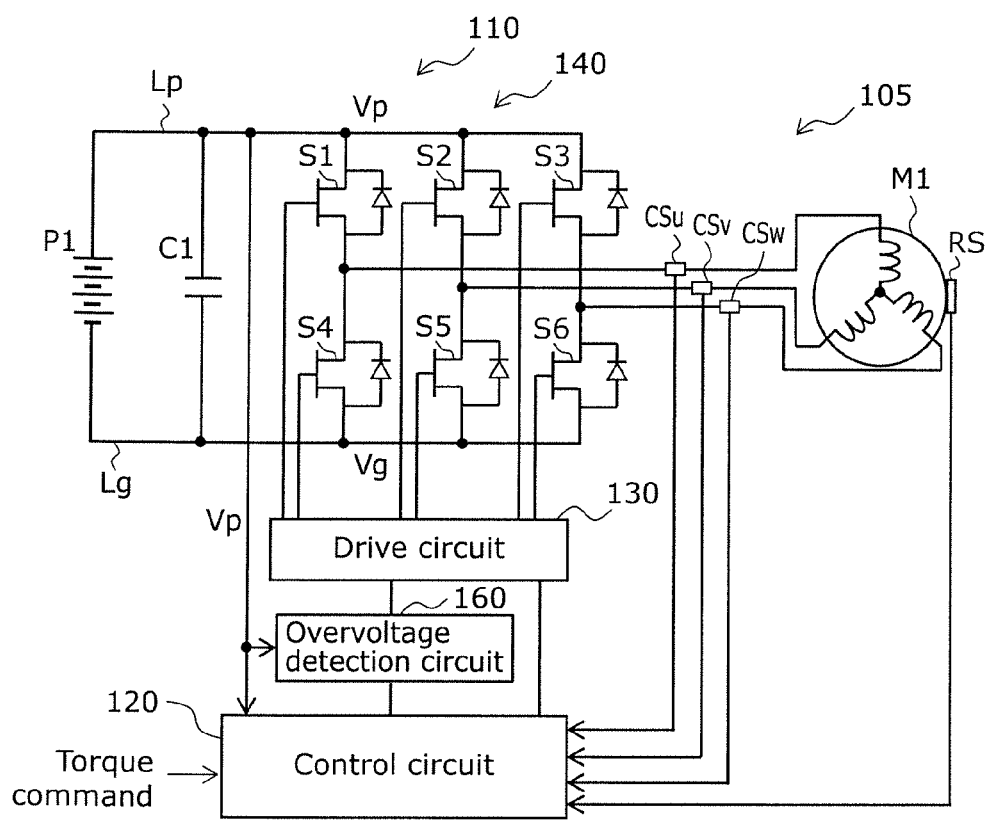
FIG. 13 is a circuit diagram illustrating an example of a three-phase bridge circuit according to Embodiment 3.

FIG. 13 is a circuit diagram illustrating an example of three-phase bridge circuit 140 included in inverter 110 of vehicle driving device 105. Note that in FIG. 13, voltage Vp is a power supply voltage, and voltage Vg is a ground voltage.

Three-phase bridge circuit 140 includes: switching elements S1, S2, and S3 provided in an upper arm group located at the upper side of FIG. 13; and switching elements S4, S5, and S6 provided in a lower arm group located at the lower side of FIG. 13. For example, switching elements S1 to S6 are configured as field-effect transistors (FETs) or insulated-gate bipolar transistors (IGBTs), for example. Switching elements S1 to S6 may be configured using wide-bandgap semiconductors.

Switching elements S1, S2, and S3 are respectively connected between three output lines extending from the three terminals of motor M1 and power supply line Lp connected to the positive electrode of battery P1. Switching elements S4, S5, and S6 are respectively connected between the three output lines and ground line Lg connected to the negative electrode of battery P1. A freewheel diode is connected in parallel to each of switching elements S1 to S6. The freewheel diodes may be parasitic diodes that are parasitic to switching elements S1 to S6.

Switching elements S1 to S6 are connected to drive circuit 130 and are driven by a signal outputted from drive circuit 130. Motor M1 is driven in exerting, regeneration, and coasting states based on the driving of switching elements S1 to S6.

Next, drive circuit 130 will be described with reference to FIG. 12.

Drive circuit 130 drives switching elements S1 to S6 of three-phase bridge circuit 140 in order to perform the three-phase PWM control and the three-phase short-circuit control. The input end of drive circuit 130 is connected to control circuit 120, and the output end of drive circuit 130 is connected to three-phase bridge circuit 140.

Drive circuit 130 includes switching circuit 131, buffer circuit 132, and three-phase short circuit 133.

Three-phase short circuit 133 is used for short-circuiting each of the three phases of motor M1. Specifically, when overvoltage detection circuit 160, which will be described later, outputs three-phase short-circuit signal s102 for performing three-phase short-circuiting, three-phase short circuit 133 short-circuits each switching element of one arm group, and releases each switching element of the other arm group, among switching elements S1 to S3 of the upper arm group and switching elements S4 to S6 of the lower arm group of three-phase bridge circuit 140. By short-circuiting each of the three phases of motor M1 in such a manner, it is possible to eliminate voltage induced from the winding coils of motor M1. Accordingly, when, for example, overvoltage is detected in three-phase bridge circuit 140, it is possible to reduce the overvoltage on three-phase bridge circuit 140 by causing three-phase short circuit 133 to perform the three-phase short-circuit control.

Switching circuit 131 switches whether to drive three-phase bridge circuit 140 based on a drive signal outputted from drive signal operator 123, which will be described later, or drive three-phase bridge circuit 140 using a signal outputted from three-phase short circuit 133. However, after malfunction determination unit 125, which will be described later, outputs three-phase short circuit usage inhibition signal s103 to inhibit driving of three-phase bridge circuit 140 using a signal outputted from three-phase short circuit 133, malfunction determination unit 125 inhibits driving of three-phase bridge circuit 140 using a signal outputted from three-phase short circuit 133. Note that the drive signal outputted from drive signal operator 123 includes various signals such as a signal for performing the three-phase PWM control on three-phase bridge circuit 140. The switching by switching circuit 131 is implemented by, for example, a hard logic circuit.

Buffer circuit 132 amplifies an output signal which is to be outputted to three-phase bridge circuit 140, to be able to drive switching elements S1 to S6. By buffer circuit 132 amplifying the output signal, it becomes possible to drive three-phase bridge circuit 140.

Next, control circuit 120 and overvoltage detection circuit 160 will be described with reference to FIG. 12 and FIG. 14 to FIG. 16.

Control circuit 120 includes microprocessor 150 which performs various computations etc., and memory 124 which stores, for example, a program or information for causing microprocessor 150 to operate.

As illustrated in FIG. 12, control circuit 120 includes motor control signal obtaining unit 121, motor control signal operator 122, drive signal operator 123, active check instruction unit 126, malfunction determination unit 125, and three-phase short-circuit control signal interruption unit 127.

Motor control signal obtaining unit 121 obtains information detected by various sensors such as current sensors CSu, CSv, and CSw that detect the current flowing through motor M1, and rotational position sensor RS that detects a rotational position by detecting magnetic pole positions of motor M1. Note that current sensors CSu, CSv, and CSw detect current values in phase u, phase v, and phase w of motor M1. Motor control signal obtaining unit 121 obtains information on voltage Vp at power supply line Lp. Motor control signal obtaining unit 121 obtains control command information, such as a torque command, outputted from the outside of control circuit 120, for example, an electronic control unit (ECU) of electric vehicle 101.

Motor control signal operator 122 performs a computation to convert the above information obtained by motor control signal obtaining unit 121 into a control signal for controlling motor M1, and outputs the control signal. For example, motor control signal operator 122 outputs the control signal so that the torque of motor M1 at the time when vehicle driving device 105 is operating becomes a target torque (for example, a torque in accordance with an operating amount of the accelerator pedal of electric vehicle 101) indicated by the torque command.

Motor control signal operator 122 also performs a computation to convert the above information obtained by motor control signal obtaining unit 121 into a control signal for testing the three-phase short-circuiting, and outputs the control signal. For example, motor control signal operator 122 converts the control command information such as the torque command into a control signal, and outputs the control signal to active check instruction unit 126. Motor control signal operator 122 converts information, such as the current flowing through motor M1, the rotational positions of the magnetic poles of motor M1, and voltage Vp at power supply line Lp, into a control signal, and outputs the control signal to malfunction determination unit 125.

Active check instruction unit 126 is a circuit which outputs active check signal s101 which forces overvoltage detection circuit 160 to output three-phase short-circuit signal s102. In the following description, a third active check refers to forcing overvoltage detection circuit 160 to output three-phase short-circuit signal s102 so as to test the three-phase short-circuit control which is performed by overvoltage detection circuit 160 and three-phase short circuit 133, and check whether or not overvoltage detection circuit 160 and three-phase short circuit 133 can perform the three-phase short-circuit control. By performing the third active check, it is possible to determine whether or not there is an anomaly in the three-phase short-circuiting performed by overvoltage detection circuit 160 and three-phase short circuit 133.

Figure 14:
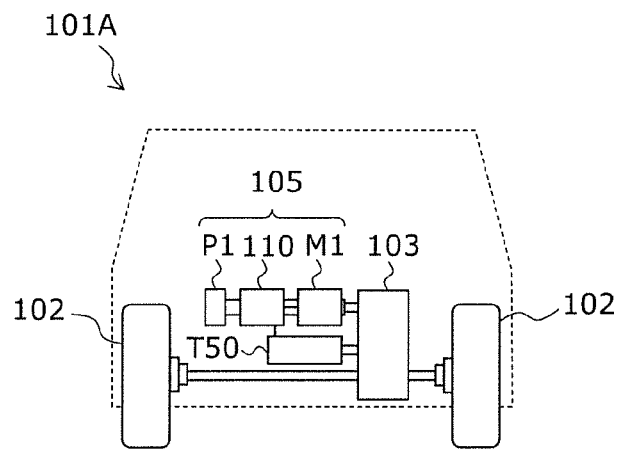
FIG. 14 is a schematic view illustrating another example of an electric vehicle including the vehicle driving device according to Embodiment 3.
Figure 15:
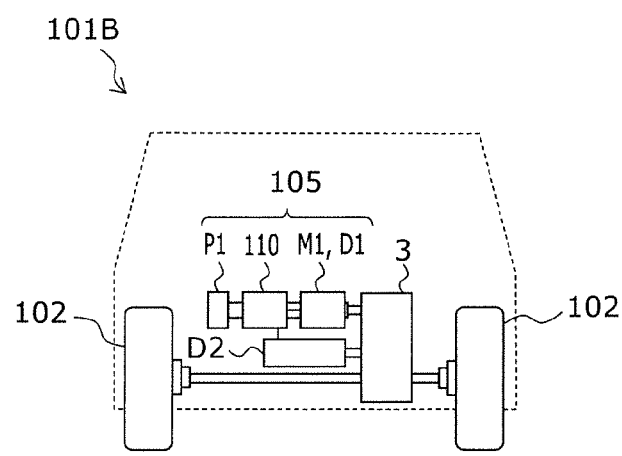
FIG. 15 is a schematic view illustrating yet another example of an electric vehicle including the vehicle driving device according to Embodiment 3.

Active check instruction unit 126 determines whether or not motor M1 is in motion under a predetermined condition based on the control signal outputted from motor control signal operator 122, and outputs active check signal s101 when it is determined that motor M1 is in motion under the predetermined condition. Specifically, active check instruction unit 126 may output active check signal s101 when the vehicle is traveling and motor M1 is in neither the exerting state nor the regeneration state. When the vehicle is in a stop state, active check instruction unit 126 may output active check signal s101 after the current control is performed using three-phase bridge circuit 140 to pass, through motor M1, current the current value of which is not high enough to start the vehicle. In the case where torque applying device T50 which applies torque to driven wheels 102 of the vehicle is included as illustrated in FIG. 14, active check instruction unit 126 may, when motor M1 is regenerating, output active check signal s101 based on a three-phase short-circuit torque which is a torque produced in motor M1 when three-phase short-circuit control is performed. Furthermore, in the case where motor M1 is one driving source D1 and the vehicle includes another driving source D2 different from driving source D1 as illustrated in FIG. 15, active check instruction unit 126 may output malfunction simulation signal s14 when the vehicle can be driven using driving source D2 without using driving source D1. Whether or not these motors M1 are in motion under a predetermined condition is determined at regular time intervals. Active check instruction unit 126 outputs active check signal s101, and at the same time, outputs a busy signal to malfunction determination unit 125 indicating that the third active check is currently being performed.

Overvoltage detection circuit 160 is a circuit which detects a predetermined overvoltage at power supply line Lp. More specifically, overvoltage detection circuit 160 outputs three-phase short-circuit signal s102 when a predetermined overvoltage is detected at power supply line Lp. Furthermore, active check signal s101 from active check instruction unit 126 forces overvoltage detection circuit 160 to output three-phase short-circuit signal s102. Note that the predetermined overvoltage is determined in advance such that a voltage at power supply line Lp does not exceed a breakdown voltage of switching elements S1 to S6 of three-phase bridge circuit 140 or smoothing capacitor C1.

Figure 16:
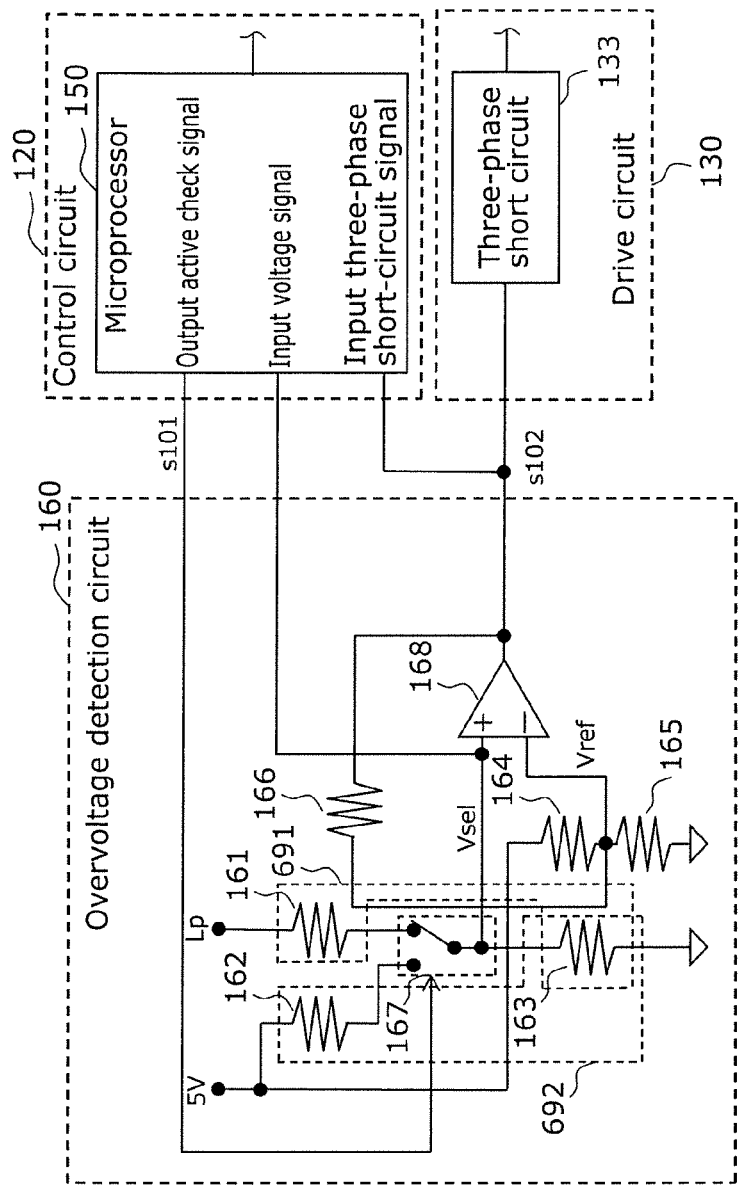
FIG. 16 is a circuit diagram illustrating an example of an overvoltage detection circuit according to Embodiment 3.

FIG. 16 is a circuit diagram illustrating an example of overvoltage detection circuit 160.

As illustrated in FIG. 16, overvoltage detection circuit 160 includes first resistor element 161, second resistor element 162, third resistor element 163, fourth resistor element 164, fifth resistor element 165, sixth resistor element 166, selection circuit 167, and comparison circuit 168.

First resistor element 161 has one terminal connected to power supply line Lp and the other terminal connected to selection circuit 167.

Second resistor element 162 has one terminal connected to a constant voltage source (here, a 5-V constant voltage source) and the other terminal connected to selection circuit 167.

Third resistor element 163 has one terminal connected to selection circuit 167 and the other terminal connected to ground line Lg.

Selection circuit 167 selectively switches between connection of the other terminal of first resistor element 161 with the one terminal of third resistor element 163 and connection of the other terminal of second resistor element 162 with the one terminal of third resistor element 163, according to active check signal s101. Specifically, when active check signal s101 is not outputted, selection circuit 167 connects the other terminal of first resistor element 161 to the one terminal of third resistor element 163, and a voltage at the one terminal of third resistor element 163 is thereby outputted to selection circuit 167, whereas when active check signal s101 is outputted, selection circuit 167 connects the other terminal of second resistor element 162 to the one terminal of third resistor element 163, and a voltage at the one terminal of third resistor element 163 is thereby outputted to selection circuit 167.

First resistor element 161 and third resistor element 163 form a first voltage dividing circuit which obtains a first divided voltage through voltage division by performing resistance division on voltage Vp at power supply line Lp. Accordingly, the first divided voltage is in proportion to voltage Vp. The first divided voltage is selectively outputted to comparison circuit 168 by selection circuit 167 as the voltage at the one terminal of third resistor element 163.

Second resistor element 162 and third resistor element 163 form a second voltage dividing circuit which obtains a second divided voltage through voltage division by performing resistance division on a voltage at a constant voltage source (here, 5 V). The value of second resistor element 162 is determined so as to make the second divided voltage a voltage at which three-phase short-circuit signal s102 of comparison circuit 168 is outputted, that is, a voltage that exceeds reference voltage Vref. The second divided voltage is selectively outputted to comparison circuit 168 by selection circuit 167 as the voltage at the one terminal of third resistor element 163. Hereinafter, the first divided voltage or the second divided voltage selectively outputted by selection circuit 167 is also referred to as "selection voltage Vsel".

Fourth resistor element 164 has one terminal connected to the constant voltage source (here, the 5-V constant voltage source) and the other terminal connected to fifth resistor element 165.

Fifth resistor element 165 has one terminal connected to fourth resistor element 164, and the other terminal connected to ground line Lg.

Fourth resistor element 164 and fifth resistor element 165 generate reference voltage Vref by performing resistance division on a voltage at the constant voltage source (here, 5 V). Here, the resistance value of first resistor element 161 and the resistance value of third resistor element 163 are set such that the first divided voltage exceeds reference voltage Vref when voltage Vp at power supply line Lp is a predetermined overvoltage. The resistance value of second resistor element 162 and the resistance value of third resistor element 163 are set such that the second divided voltage exceeds reference voltage Vref.

Sixth resistor element 166 has one terminal connected to an output terminal of comparison circuit 168 (described later), and the other terminal connected to a negative input terminal of comparison circuit 168 (described later). Sixth resistor element 166 feeds back output of comparison circuit 168 to the negative input terminal of comparison circuit 168.

Comparison circuit 168 has a positive input terminal, the negative input terminal, and the output terminal which outputs a result of comparison between a voltage at the positive input terminal and a voltage at the negative input terminal. The positive input terminal is connected with output of selection circuit 167. Selection voltage Vsel outputted from selection circuit 167 is inputted to the positive input terminal. The negative input terminal is connected with the connection point between fourth resistor element 164 and fifth resistor element 165. Reference voltage Vref is inputted to the negative input terminal. Comparison circuit 168 outputs three-phase short-circuit signal s102 from the output terminal when selection voltage Vsel inputted to the positive input terminal is greater than reference voltage Vref inputted to the negative input terminal.

With overvoltage detection circuit 160 having the above configuration, in the case where active check signal s101 is not outputted from active check instruction unit 126, the first divided voltage outputted as selection voltage Vsel from selection circuit 167 exceeds reference voltage Vref when voltage Vp at power supply line Lp becomes a predetermined overvoltage. Thus, overvoltage detection circuit 160 outputs three-phase short-circuit signal s102. Furthermore, with overvoltage detection circuit 160 having the above configuration, in the case where active check signal s101 is outputted from active check instruction unit 126, the second divided voltage exceeding reference voltage Vref is outputted as selection voltage Vsel from selection circuit 167. Thus, overvoltage detection circuit 160 outputs three-phase short-circuit signal s102.

Malfunction determination unit 125 is a circuit which determines whether or not there is an anomaly in the three-phase short-circuiting performed by overvoltage detection circuit 160 and three-phase short circuit 133. Malfunction determination unit 125 obtains information on at least one of (i) a change in the current flowing through the three phases of motor M1, (ii) a change in a current phase, or (iii) a change in a DC voltage at three-phase bridge circuit 140, which occur when the three-phase short-circuit control is performed. A change in the current can be calculated based on the current values detected by current sensors CSu, CSv, and CSw. A change in the current phase can be calculated from, for example, a change in a d-axis current of motor M1. The d-axis current can be calculated based on the current values detected by current sensors CSu, CSv, and CSw, and the rotational positions of the magnetic poles detected by rotational position sensor RS. A change in the DC voltage can be calculated by detecting voltage Vp at power supply line Lp.

Malfunction determination unit 125 determines, based on the information obtained, whether or not there is an anomaly in the three-phase short-circuiting performed by overvoltage detection circuit 160 and three-phase short circuit 133. For example, malfunction determination unit 125 determines that there is an anomaly in the three-phase short-circuiting performed by overvoltage detection circuit 160 and three-phase short circuit 133 when at least one of the current, the current phase, and the DC voltage is outside a specified range. When determining that there is an anomaly in the three-phase short-circuiting performed by overvoltage detection circuit 160 and three-phase short circuit 133, malfunction determination unit 125 outputs three-phase short circuit usage inhibition signal s103 to switching circuit 131 to inhibit driving of three-phase bridge circuit 140 using a signal outputted from three-phase short circuit 133. When determining that there is an anomaly in the three-phase short-circuiting performed by overvoltage detection circuit 160 and three-phase short circuit 133, malfunction determination unit 125 outputs a notification signal that notifies an external device of malfunction information.

Further, three-phase short-circuit signal s102 and selection voltage Vsel outputted from overvoltage detection circuit 160 are inputted to malfunction determination unit 125.

In the case where active check signal s101 is outputted from active check instruction unit 126, malfunction determination unit 125 determines that second voltage dividing circuit 692 and selection circuit 167 are functioning properly when selection voltage Vsel is a predetermined voltage. The predetermined voltage here refers to the second divided voltage outputted from selection circuit 167 when second voltage dividing circuit 692 and selection circuit 167 are functioning properly. In the case of not determining that second voltage dividing circuit 692 and selection circuit 167 are functioning properly, malfunction determination unit 125 outputs a notification signal that notifies an external device of the determination result.

Malfunction determination unit 125 determines that overvoltage detection circuit 160 is functioning properly when three-phase short-circuit signal s102 is a predetermined signal. The predetermined signal here refers to three-phase short-circuit signal s102 which is outputted from overvoltage detection circuit 160 when overvoltage detection circuit 160 is functioning properly. In the case of not determining that overvoltage detection circuit 160 is functioning properly, malfunction determination unit 125 outputs a notification signal that notifies an external device of the determination result.

In the case of receiving from malfunction determination unit 125 the malfunction information indicating that there is an anomaly in the three-phase short-circuiting performed by overvoltage detection circuit 160 and three-phase short circuit 133, three-phase short-circuit control signal interruption unit 127 outputs, when an anomaly is detected in inverter 110, an interruption signal to drive signal operator 123 for performing the three-phase short-circuiting.

Drive signal operator 123 calculates a drive signal necessary for driving motor M1, based on the control signal outputted from motor control signal operator 122, and outputs the drive signal to drive circuit 130. When vehicle driving device 105 is operating normally, drive signal operator 123 outputs a drive signal for performing the three-phase PWM control. In contrast, when the interruption signal is outputted from three-phase short-circuit control signal interruption unit 127, drive signal operator 123 outputs a drive signal for performing the three-phase short-circuit control by a program stored in memory 124. Upon receiving the interruption signal, drive signal operator 123 changes the drive signal for the three-phase PWM control to the drive signal for the three-phase short-circuit control, and outputs the drive signal for the three-phase short-circuit control to drive circuit 130.

In such a manner, control circuit 120 outputs either the drive signal for the three-phase PWM control or the drive signal for the three-phase short-circuit control, to drive circuit 130. Drive circuit 130 selects one of the drive signal outputted from control circuit 120 and the signal outputted from three-phase short circuit 133, and outputs the selected signal to three-phase bridge circuit 140. Three-phase bridge circuit 140 drives motor M1 based on the signal outputted from drive circuit 130.

With vehicle driving device 105 according to Embodiment 3 having the configuration described above, by control circuit 120 outputting active check signal s101 as appropriate, it is possible to appropriately determine whether or not there is an anomaly in the three-phase short-circuiting performed by overvoltage detection circuit 160 and three-phase short circuit 133. Accordingly, with vehicle driving device 105 according to Embodiment 3 having the configuration described above, it is possible to promptly discover latent malfunctions in the three-phase short-circuit control in inverter 110, and increase reliability of vehicle driving device 105.

[3-2. Operation of Vehicle Driving Device]

Next, an operation relating to the active check of vehicle driving device 105 will be described with reference to FIG. 17.

Figure 17:
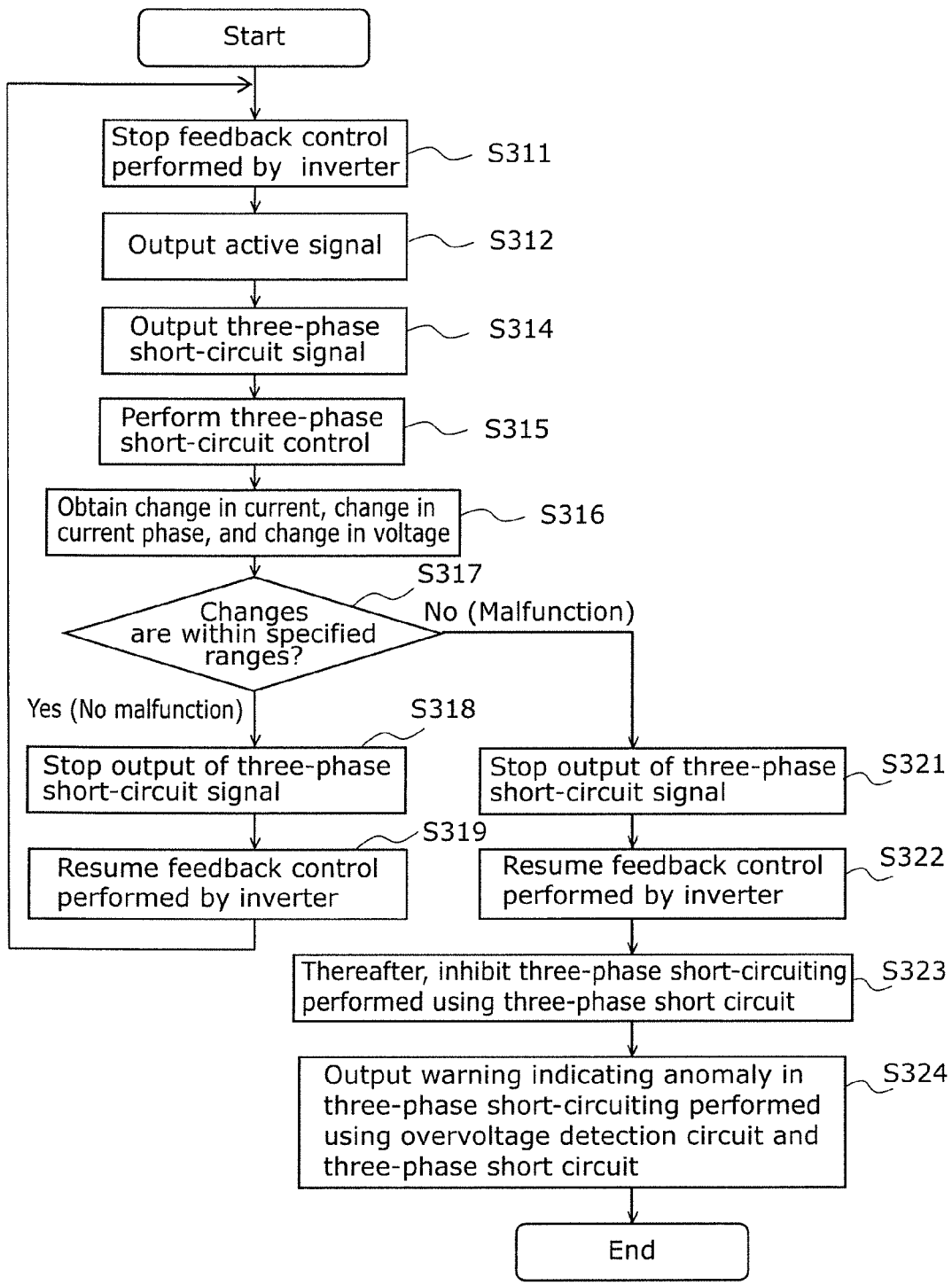
FIG. 17 is a flow chart illustrating an example of an operation relating to an active check of the vehicle driving device according to Embodiment 3.

FIG. 17 is a flow chart illustrating an example of an operation relating to the active check of vehicle driving device 105.

Control circuit 120 stops the feedback control performed by inverter 110 (Step S311) and outputs active check signal s101 (Step S312) so as to perform the third active check.

When active check signal s101 is outputted, in overvoltage detection circuit 160, selection circuit 167 outputs the second divided voltage which is greater than reference voltage Vref, and comparison circuit 168 outputs three-phase short-circuit signal s102. With this, overvoltage detection circuit 160 continues to output three-phase short-circuit signal s102 until it is stopped in Step S318 or Step S321 which will be described later (Step S314).

Next, inverter 110 performs the three-phase short-circuit control using three-phase short circuit 133 (Step S315). Here, switching circuit 131 switches the output signal of switching circuit 131 to the signal outputted from three-phase short circuit 133, rather than the drive signal outputted from drive signal operator 123. Then, the signal outputted from three-phase short circuit 133 is outputted to three-phase bridge circuit 140 via buffer circuit 132. With this, the three-phase short-circuit control using three-phase short circuit 133 is tested on three-phase bridge circuit 140.

Next, control circuit 120 obtains a change in current, a change in a current phase, and a change in voltage in vehicle driving device 105 (Step S316). Specifically, motor control signal obtaining unit 121 obtains information on, for example, current sensors CSu, CSv, and CSw, rotational position sensor RS, and voltage Vp at power supply line Lp. Motor control signal operator 122 converts the information into a control signal, and outputs the control signal to malfunction determination unit 125.

Next, control circuit 120 determines whether or not there is an anomaly in the three-phase short-circuiting performed by overvoltage detection circuit 160 and three-phase short circuit 133, based on whether or not the changes in current, current phase, and voltage are within specified ranges (Step S317). Specifically, malfunction determination unit 125 determines whether the current is outside a specified range, whether the current phase is outside a specified range, and whether the DC voltage is outside a specified range.

When determining that the changes in the current, current phase, and voltage are all within the respective specified ranges (Yes in S317), malfunction determination unit 125 determines that there is no anomaly in the three-phase short-circuiting performed by overvoltage detection circuit 160 and three-phase short circuit 133, that is, malfunction determination unit 125 determines that the three-phase short-circuiting performed by overvoltage detection circuit 160 and three-phase short circuit 133 is functioning properly. At this time, control circuit 120 stops the output of three-phase short-circuit signal s102 by stopping the output of active check signal s101 (Step S318). Control circuit 120 then resumes the feedback control performed by inverter 110 (Step S319), and thereafter, returns to Step S311 when an active check is to be performed.

On the other hand, when at least one of the changes in the current, current phase, and voltage is outside the specified range (No in S317), control circuit 120 determines that there is an anomaly in the three-phase short-circuiting performed by overvoltage detection circuit 160 and three-phase short circuit 133. At this time, control circuit 120 stops the output of active check signal s101 (Step S321), and resumes the feedback control performed by inverter 110 (Step S322).

Meanwhile, control circuit 120 transmits three-phase short circuit usage inhibition signal s103 to drive circuit 130. After three-phase short circuit usage inhibition signal s103 is transmitted, switching circuit 131 of drive circuit 130 inhibits driving of three-phase bridge circuit 140 using a signal outputted from three-phase short circuit 133, so as to inhibit the three-phase short-circuiting performed using three-phase short circuit 133 (Step S323).

Next, control circuit 120 outputs, to an external device such as the ECU (an upstream controller) of electric vehicle 101, a malfunction warning indicating that there is an anomaly in the three-phase short-circuiting performed by overvoltage detection circuit 160 and three-phase short circuit 133 (Step S324). The user may be notified of malfunction information by malfunction determination unit 125 displaying the malfunction information via a monitor or outputting a sound informing the malfunction information via a loudspeaker. Note that in this case, there is an anomaly in the three-phase short-circuiting, and thus, no subsequent active check is performed, and the flow chart of FIG. 17 is ended.

Embodiment 4

The following describes a vehicle driving device according to Embodiment 4 which is configured by changing some of the constituent elements of vehicle driving device 105 according to Embodiment 3.

Figure 18:
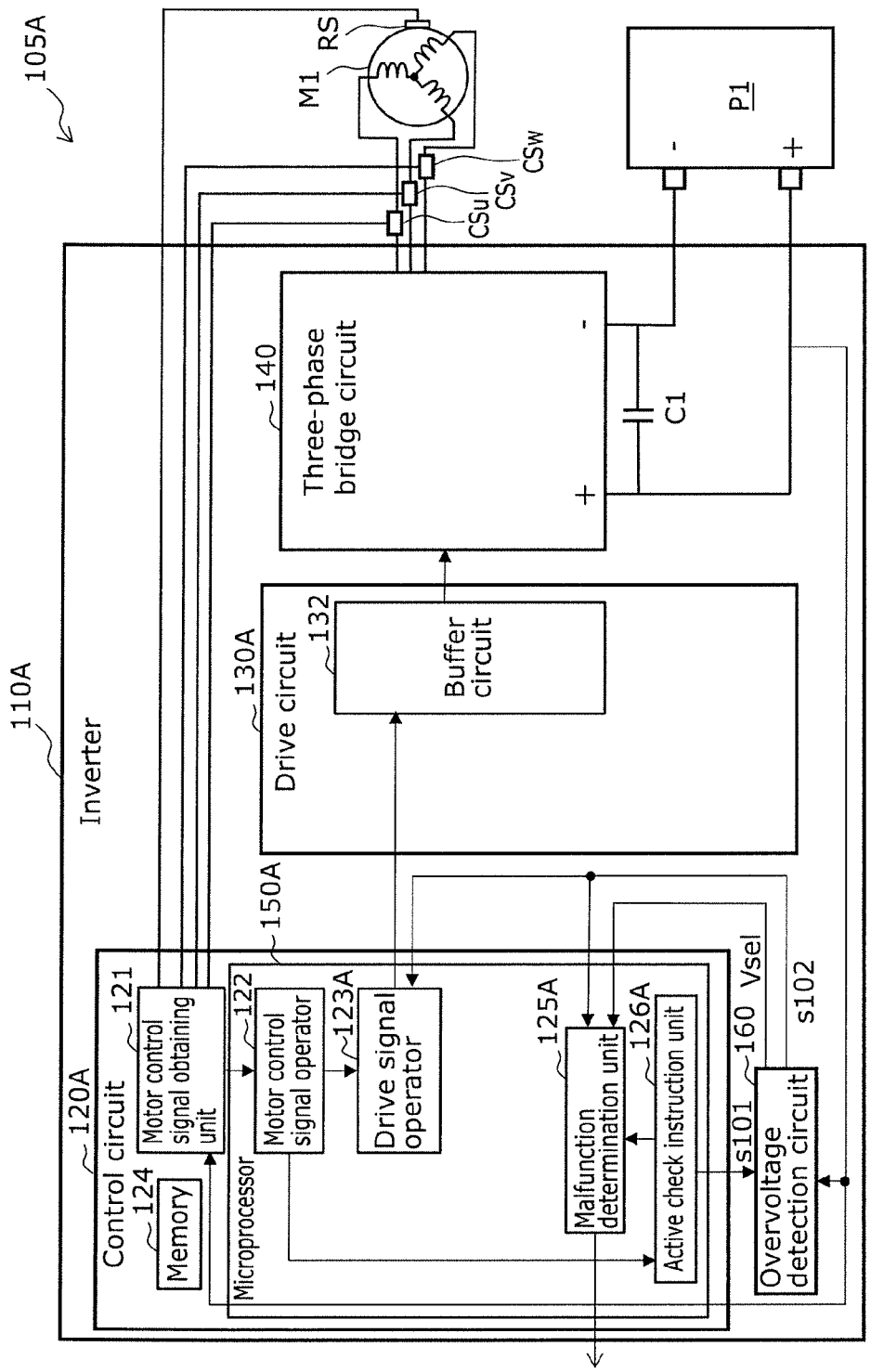
FIG. 18 is a circuit diagram illustrating an example of a vehicle driving device according to Embodiment 4.

FIG. 18 is a circuit diagram illustrating an example of vehicle driving device 105A according to Embodiment 4. In the following description, constituent elements of vehicle driving device 105A that are common to vehicle driving device 105 according to Embodiment 3 are given the same reference signs, and the detailed description thereof will be omitted as they have already been described. The following description will focus on the aspects of vehicle driving device 105A that are different from vehicle driving device 105.

As illustrated in FIG. 18, drive signal operator 123, malfunction determination unit 125, and active check instruction unit 126 which are included in vehicle driving device 105 according to Embodiment 3 are changed to drive signal operator 123A, malfunction determination unit 125A, and active check instruction unit 126A in vehicle driving device 105A, respectively, and three-phase short-circuit control signal interruption unit 127 included in vehicle driving device 105 according to Embodiment 3 is removed in vehicle driving device 105A. Along with these changes and the removal, microprocessor 150 is changed to microprocessor 150A, and control circuit 120 is changed to control circuit 120A. Furthermore, switching circuit 131 and three-phase short circuit 133 included in vehicle driving device 105 according to Embodiment 3 are removed in vehicle driving device 105A. Along with these removals, drive circuit 130 is changed to drive circuit 130A. Furthermore, along with the changes from control circuit 120 and drive circuit 130 included in vehicle driving device 105 according to Embodiment 3 to control circuit 120A and drive circuit 130A in vehicle driving device 105A, inverter 110 is changed to inverter 110A in vehicle driving device 105A.

Drive signal operator 123A calculates a drive signal necessary for driving motor M1, based on the control signal outputted from motor control signal operator 122, and outputs the drive signal to drive circuit 130A. When vehicle driving device 105A is operating normally, drive signal operator 123A outputs a drive signal for performing the three-phase PWM control. In contrast, when three-phase short-circuit signal s102 is outputted from overvoltage detection circuit 160, drive signal operator 123A outputs a drive signal for performing the three-phase short-circuit control by a program stored in memory 124. Upon receiving three-phase short-circuit signal s102, drive signal operator 123A changes the drive signal for the three-phase PWM control to the drive signal for the three-phase short-circuit control, and outputs the drive signal for the three-phase short-circuit control to drive circuit 130A.

In such a manner, control circuit 120A outputs either the drive signal for the three-phase PWM control or the drive signal for the three-phase short-circuit control, to drive circuit 130A. Drive circuit 130A amplifies the drive signal outputted from control circuit 120A, and outputs the amplified drive signal to three-phase bridge circuit 140. Three-phase bridge circuit 140 drives motor M1 based on the signal outputted from drive circuit 130A.

Active check instruction unit 126A is a circuit which outputs active check signal s101 which forces overvoltage detection circuit 160 to output three-phase short-circuit signal s102. In the following description, a fourth active check refers to forcing overvoltage detection circuit 160 to output three-phase short-circuit signal s102 so as to test the three-phase short-circuit control which is performed by overvoltage detection circuit 160, and check whether or not overvoltage detection circuit 160 can perform the three-phase short-circuit control. By performing the fourth active check, it is possible to determine whether or not there is an anomaly in the three-phase short-circuiting performed by overvoltage detection circuit 160.

As with active check instruction unit 126 according to Embodiment 3, active check instruction unit 126A determines whether or not motor M1 is in motion under a predetermined condition, based on the control signal outputted from motor control signal operator 122, and outputs active check signal s101 when it is determined that motor M1 is in motion under the predetermined condition.

Malfunction determination unit 125A is a circuit which determines whether or not there is an anomaly in the three-phase short-circuiting performed by overvoltage detection circuit 160.

Three-phase short-circuit signal s102 and selection voltage Vsel outputted from overvoltage detection circuit 160 are inputted to malfunction determination unit 125A.

Malfunction determination unit 125A determines that there is no anomaly in the three-phase short-circuiting performed by overvoltage detection circuit 160 when three-phase short-circuit signal s102 is a predetermined signal, and determines that there is an anomaly in the three-phase short-circuiting performed by overvoltage detection circuit 160 when three-phase short-circuit signal s102 is not the predetermined signal. The predetermined signal here refers to three-phase short-circuit signal s102 which is outputted from overvoltage detection circuit 160 when overvoltage detection circuit 160 is functioning properly. When determining that there is an anomaly in the three-phase short-circuiting performed by overvoltage detection circuit 160, malfunction determination unit 125A outputs a notification signal that notifies an external device of malfunction information.

In the case where active check signal s101 is outputted from active check instruction unit 126A, malfunction determination unit 125A determines that second voltage dividing circuit 692 and selection circuit 167 are functioning properly when selection voltage Vsel is a predetermined voltage. The predetermined voltage here refers to a second divided voltage which is outputted from selection circuit 167 when second voltage dividing circuit 692 and selection circuit 167 are functioning properly. In the case of not determining that second voltage dividing circuit 692 and selection circuit 167 are functioning properly, malfunction determination unit 125A outputs a notification signal that notifies an external device of the determination result.

With vehicle driving device 105A according to Embodiment 4 having the configuration described above, by control circuit 120A outputting active check signal s101 as appropriate, it is possible to appropriately determine whether or not there is an anomaly in the three-phase short-circuiting performed by overvoltage detection circuit 160. Accordingly, with vehicle driving device 105A according to Embodiment 4 having the configuration described above, it is possible to promptly discover latent malfunctions of the three-phase short-circuit control in inverter 110A, and increase reliability of vehicle driving device 105A.

Embodiment 5

The following describes a vehicle driving device according to Embodiment 5 which is configured by changing some of the constituent elements of vehicle driving device 105A according to Embodiment 4.

Figure 19:
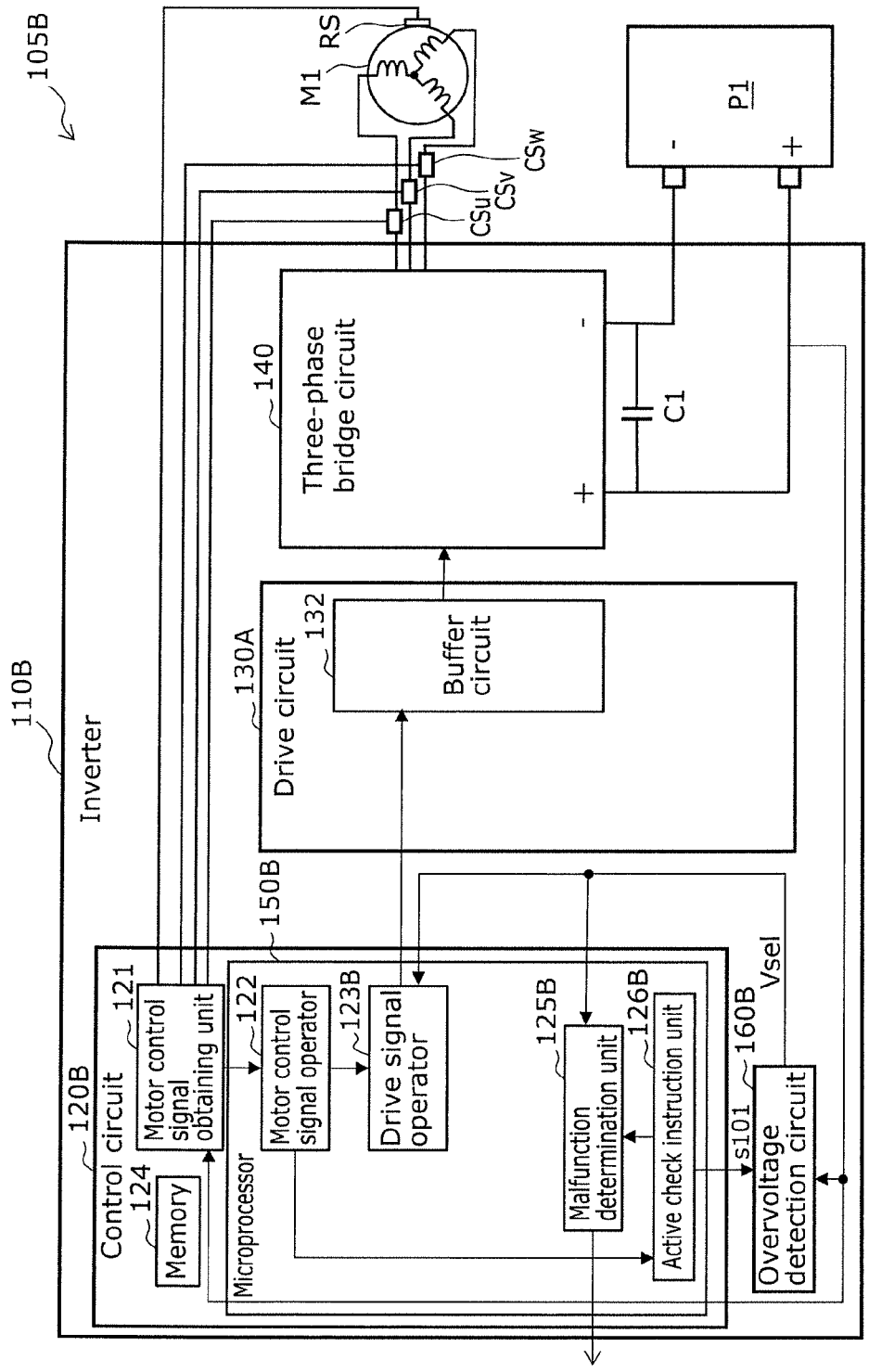
FIG. 19 is a circuit diagram illustrating an example of a vehicle driving device according to Embodiment 5.

FIG. 19 is a circuit diagram illustrating an example of vehicle driving device 105B according to Embodiment 5. In the following description, constituent elements of vehicle driving device 105B that are common to vehicle driving device 105A according to Embodiment 4 are given the same reference signs, and the detailed description thereof will be omitted as they have already been described. The following description will focus on the aspects of vehicle driving device 105B that are different from vehicle driving device 105A.

As illustrated in FIG. 19, drive signal operator 123A, malfunction determination unit 125A, and active check instruction unit 126A which are included in vehicle driving device 105A according to Embodiment 4 are changed to drive signal operator 123B, malfunction determination unit 125B, and active check instruction unit 126B in vehicle driving device 105B, respectively. Along with these changes, microprocessor 150A is changed to microprocessor 150B, and control circuit 120A is changed to control circuit 120B. Further, overvoltage detection circuit 160 included in vehicle driving device 105A according to Embodiment 4 is changed to overvoltage detection circuit 160B in vehicle driving device 105B. Furthermore, along with the changes from control circuit 120A and overvoltage detection circuit 160 included in vehicle driving device 105A according to Embodiment 4 to control circuit 120B and overvoltage detection circuit 160B in vehicle driving device 105B, inverter 110A is changed to inverter 110B in vehicle driving device 105B.

Figure 20:
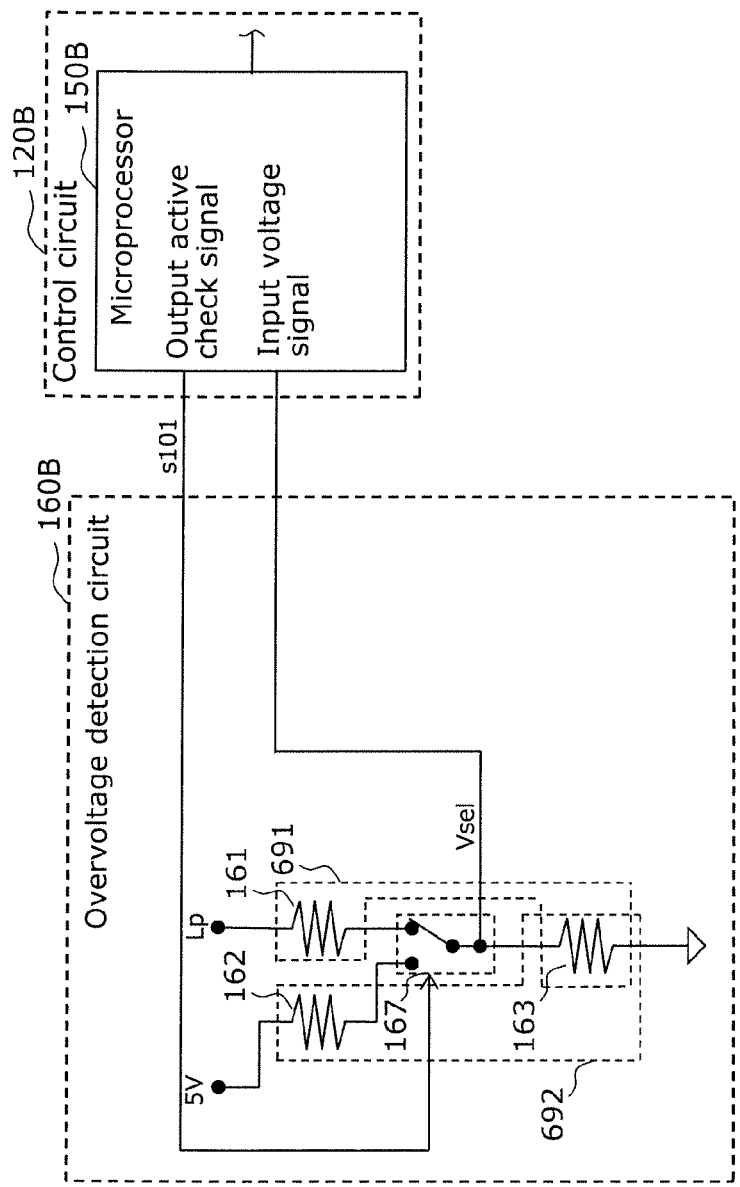
FIG. 20 is a circuit diagram illustrating an example of an overvoltage detection circuit according to Embodiment 5.

FIG. 20 is a circuit diagram illustrating an example of overvoltage detection circuit 160B.

As illustrated in FIG. 20, overvoltage detection circuit 160B is configured by removing fourth resistor element 164, fifth resistor element 165, sixth resistor element 166, and comparison circuit 168 from overvoltage detection circuit 160 according to Embodiment 4.

With the above configuration, overvoltage detection circuit 160B outputs a first divided voltage as selection voltage Vsel when active check signal s101 is not outputted from active check instruction unit 126B, and outputs a second divided voltage as selection voltage Vsel when active check signal s101 is outputted from active check instruction unit 126B.

Drive signal operator 123B calculates a drive signal necessary for driving motor M1, based on the control signal outputted from motor control signal operator 122, and outputs the drive signal to drive circuit 130A. When vehicle driving device 105B is operating normally, drive signal operator 123B outputs a drive signal for performing the three-phase PWM control. In contrast, when selection voltage Vsel outputted from overvoltage detection circuit 160B is a voltage within a range possible in the case where voltage Vp at power supply line Lp is a predetermined overvoltage (hereinafter, the voltage within this range is also referred to as an "anomalous voltage"), drive signal operator 123B outputs a drive signal for performing the three-phase short-circuit control by a program stored in memory 124. Here, the second divided voltage is a voltage included in the anomalous voltage.

Drive signal operator 123B may determine whether or not selection voltage Vsel is the anomalous voltage by converting selection voltage Vsel into a digital value using an AD converter included in microprocessor 150B and determining whether or not the digital value indicates the anomalous voltage. Drive signal operator 123B may compare selection voltage Vsel with a reference voltage using a comparator included in microprocessor 150B, for example, and determine whether or not selection voltage Vsel is the anomalous voltage based on the result of comparison.

In such a manner, control circuit 120B outputs either the drive signal for the three-phase PWM control or the drive signal for the three-phase short-circuit control, to drive circuit 130A. Drive circuit 130A amplifies the drive signal outputted from control circuit 120B, and outputs the amplified drive signal to three-phase bridge circuit 140. Three-phase bridge circuit 140 drives motor M1 based on the signal outputted from drive circuit 130A.

Active check instruction unit 126B is a circuit which outputs active check signal s101 for forcing overvoltage detection circuit 160B to output the second divided voltage. In the following description, a fifth active check refers to forcing overvoltage detection circuit 160B to output the second divided voltage so as to test the three-phase short-circuit control which is performed by overvoltage detection circuit 160B, and check whether or not overvoltage detection circuit 160B can perform the three-phase short-circuit control. By performing the fifth active check, it is possible to determine whether or not there is an anomaly in the three-phase short-circuiting performed by overvoltage detection circuit 160B.

As with active check instruction unit 126A according to Embodiment 4, active check instruction unit 126B determines whether or not motor M1 is in motion under a predetermined condition, based on the control signal outputted from motor control signal operator 122, and outputs active check signal s101 when it is determined that motor M1 is in motion under the predetermined condition.

Malfunction determination unit 125B is a circuit which determines whether or not there is an anomaly in the three-phase short-circuiting performed by overvoltage detection circuit 160B.

Selection voltage Vsel outputted from overvoltage detection circuit 160B is inputted to malfunction determination unit 125B.

Malfunction determination unit 125B determines that there is no anomaly in the three-phase short-circuiting performed by overvoltage detection circuit 160B when active check signal s101 is outputted and selection voltage Vsel is a predetermined voltage, and determines that there is an anomaly in the three-phase short-circuiting performed by overvoltage detection circuit 160B when selection voltage Vsel is not the predetermined voltage. The predetermined voltage here refers to selection voltage Vsel which is outputted from overvoltage detection circuit 160B in the case where overvoltage detection circuit 160B is functioning properly at the time when active check signal s101 is outputted. When determining that there is an anomaly in the three-phase short-circuiting performed by overvoltage detection circuit 160B, malfunction determination unit 125B outputs a notification signal that notifies an external device of malfunction information.

Malfunction determination unit 125B may determine whether or not selection voltage Vsel is the predetermined voltage by converting selection voltage Vsel into a digital value using the AD converter included in microprocessor 150B and determining whether or not the digital value indicates the predetermined voltage. Drive signal operator 123B may compare selection voltage Vsel and a reference voltage using the comparator included in microprocessor 150B, for example, and determine whether or not selection voltage Vsel is the predetermined voltage based on the result of comparison.

With vehicle driving device 105B according to Embodiment 5 having the configuration described above, by control circuit 120B outputting active check signal s101 as appropriate, it is possible to appropriately determine whether or not there is an anomaly in the three-phase short-circuiting performed by overvoltage detection circuit 160B. Accordingly, with vehicle driving device 105B according to Embodiment 5 having the configuration described above, it is possible to promptly discover latent malfunctions of the three-phase short-circuit control in inverter 110B, and increase reliability of vehicle driving device 105B.

Embodiment 6

Next, a vehicle driving device according to Embodiment 6 will be described with reference to FIG. 21 to FIG. 23. Vehicle driving device 5C according to Embodiment 6 includes both processor anomaly detection circuit 60 described in Embodiment 1 and overvoltage detection circuit 160 described in Embodiment 3.

Figure 21:
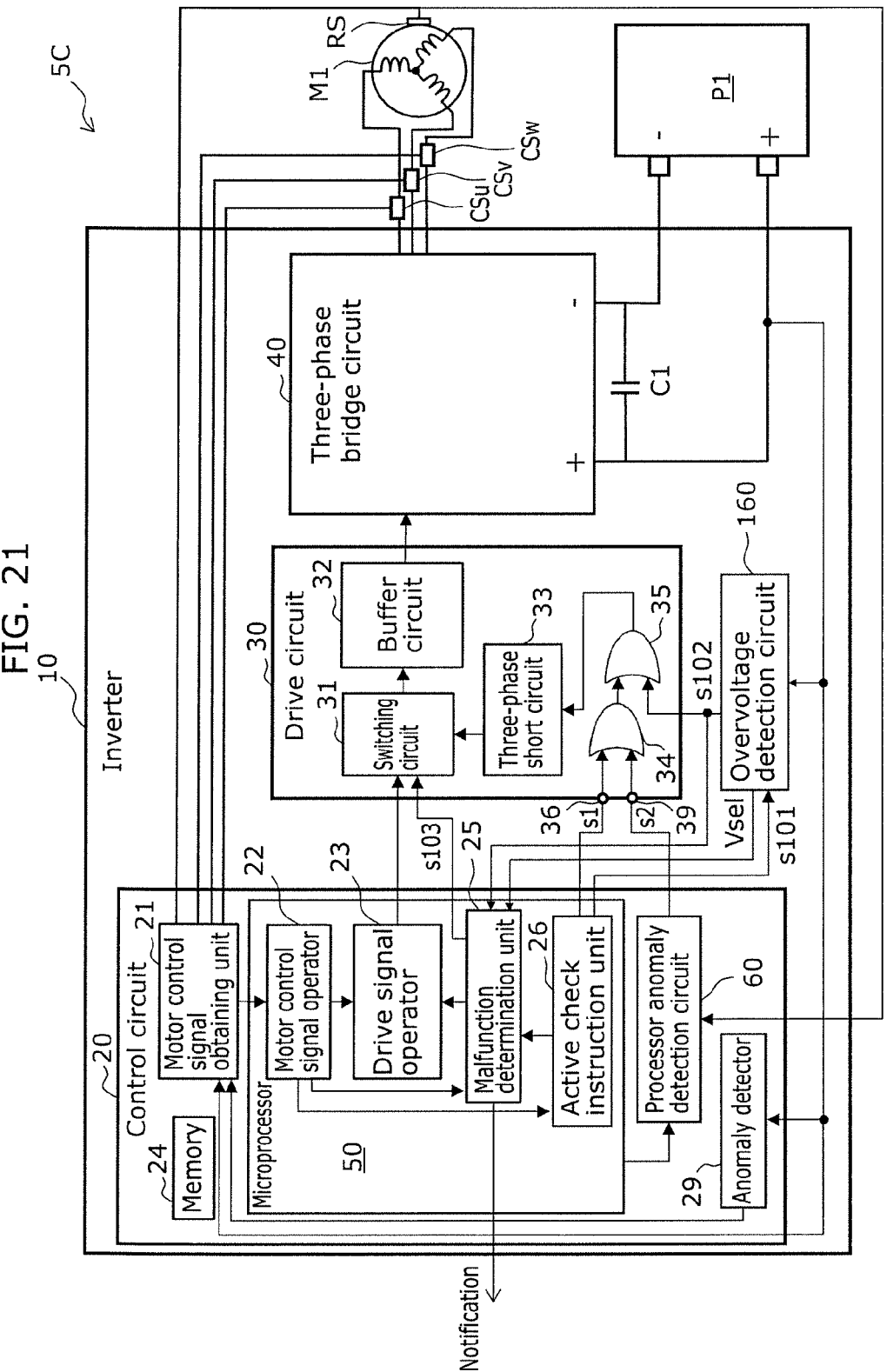
FIG. 21 is a circuit diagram illustrating an example of an inverter, a permanent magnet motor, and a battery included in a vehicle driving device according to Embodiment 6.

FIG. 21 is a circuit diagram illustrating an example of inverter 10, permanent magnet motor M1, and battery P1 included in vehicle driving device 5C according to Embodiment 6. FIG. 22 is a circuit diagram illustrating an example of three-phase bridge circuit 40 included in inverter 10 of vehicle driving device 5C. FIG. 23 is a circuit diagram illustrating an example of processor anomaly detection circuit 60 and overvoltage detection circuit 160 included in vehicle driving device 5C.

Figure 22:
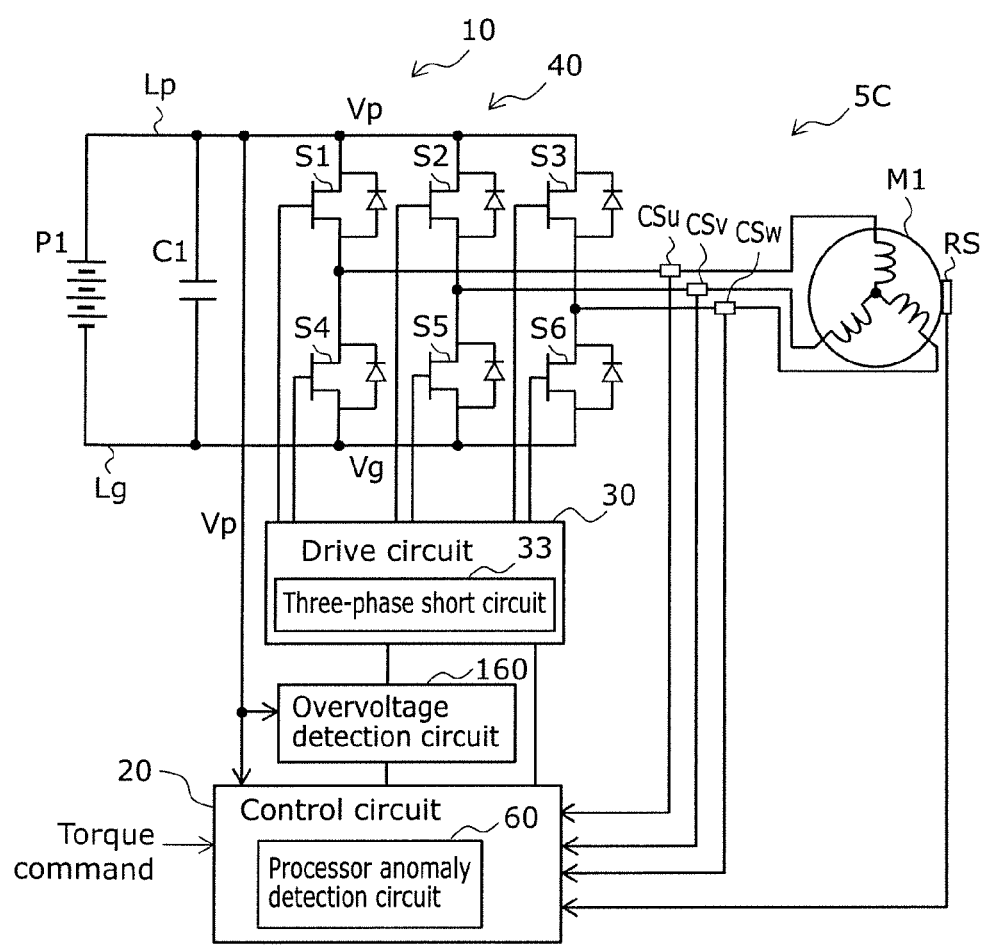
FIG. 22 is a circuit diagram illustrating an example of a three-phase bridge circuit included in the inverter of the vehicle driving device according to Embodiment 6.
Figure 23:
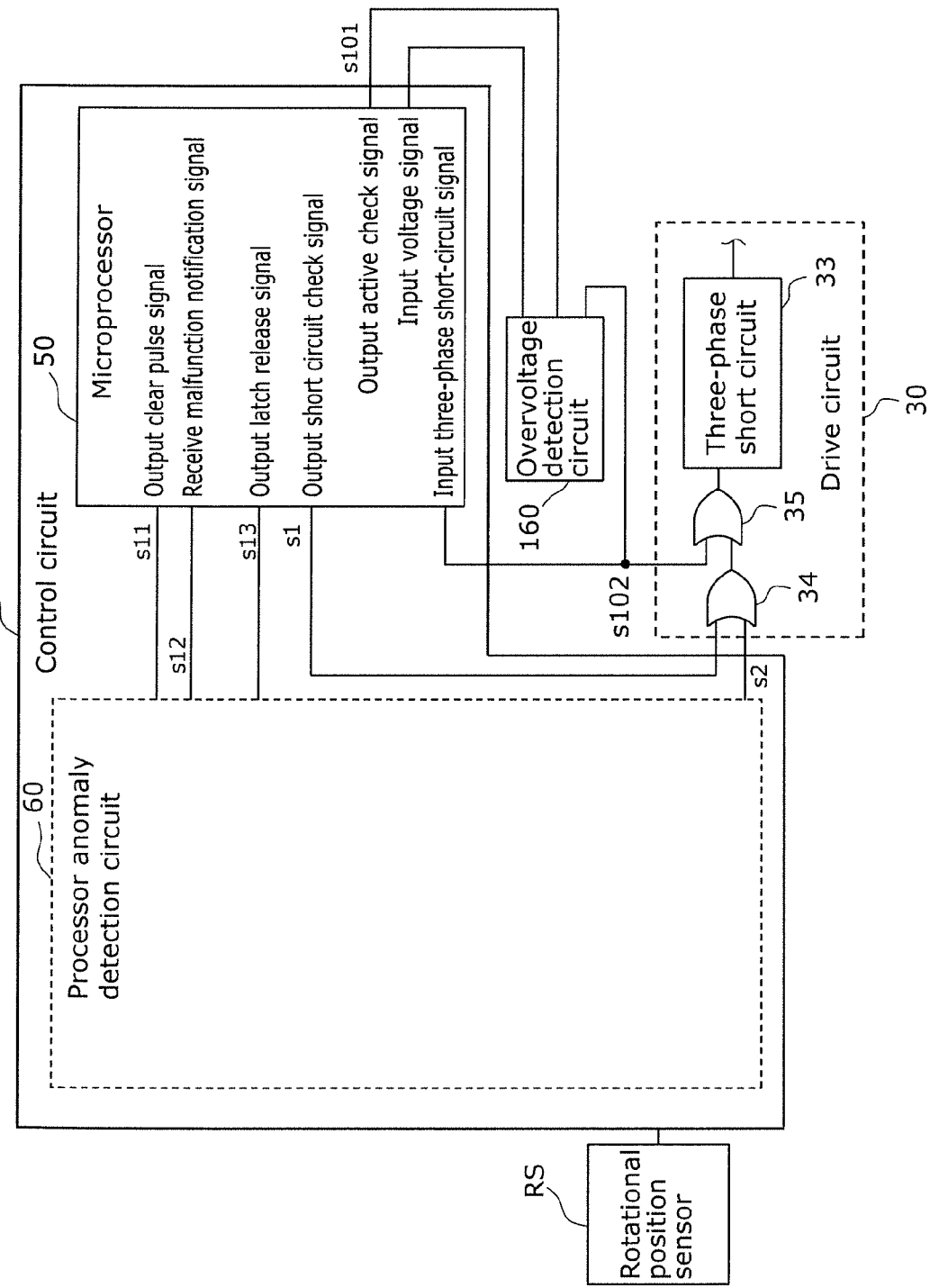
FIG. 23 is a circuit diagram illustrating an example of a processor anomaly detection circuit and an overvoltage detection circuit included in the vehicle driving device according to Embodiment 6.

Processor anomaly detection circuit 60 and overvoltage detection circuit 160 illustrated in FIG. 21 to FIG. 23 are the same as those described in Embodiments 1 and 3, and detailed descriptions thereof will be omitted.

As illustrated in FIG. 23, clear pulse signal s11 outputted from microprocessor 50 is inputted to processor anomaly detection circuit 60. Malfunction notification signal s12 outputted from processor anomaly detection circuit 60 is inputted to microprocessor 50. Latch release signal s13 outputted from microprocessor 50 is inputted to processor anomaly detection circuit 60.

Short circuit check signal s1 outputted from microprocessor 50 and three-phase short-circuit drive signal s2 outputted from processor anomaly detection circuit 60 are each inputted to OR circuit 34. A signal outputted from OR circuit 34 is inputted to OR circuit 35.

Active check signal s101 outputted from microprocessor 50 is inputted to overvoltage detection circuit 160. A voltage signal is inputted to microprocessor 50 from overvoltage detection circuit 160. Three-phase short-circuit signal s102 outputted from overvoltage detection circuit 160 is inputted to OR circuit 35 and is also inputted to microprocessor 50.

Then, a signal from OR circuit 35 is outputted to three-phase short circuit 33, and three-phase short circuit 33 is driven based on the signal outputted from OR circuit 35.

In vehicle driving device 5C according to the present embodiment, inverter 10 further includes overvoltage detection circuit 160 which detects a predetermined DC overvoltage at three-phase bridge circuit 40. Upon detecting the predetermined overvoltage, overvoltage detection circuit 160 outputs three-phase short-circuit signal s102 to three-phase short circuit 33. Control circuit 20 forces overvoltage detection circuit 160 to output three-phase short-circuit signal s102, and detects an anomaly in the three-phase short-circuiting based on at least one of (i) a change in the current flowing through the three phases, (ii) a change in a current phase in the three phases, or (iii) a change in a DC voltage, which occur when overvoltage detection circuit 160 forcedly outputs three-phase short-circuit signal s102.

Overvoltage detection circuit 160 includes: first voltage dividing circuit 691 which obtains a first divided voltage through voltage division by performing resistance division on the DC voltage; second voltage dividing circuit 692 which obtains a second divided voltage through voltage division by performing resistance division on a predetermined voltage, the second divided voltage being detected as the predetermined overvoltage; selection circuit 167 which selects and outputs one of the first divided voltage and the second divided voltage; and comparison circuit 168 which compares reference voltage Vref with the one of the first divided voltage and the second divided voltage outputted from selection circuit 167, and outputs three-phase short-circuit signal s102 based on a comparison result (see FIG. 16). Control circuit 20 forces overvoltage detection circuit 160 to output three-phase short-circuit signal s102 by causing selection circuit 167 to output the second divided voltage when permanent magnet motor M1 is in motion under a predetermined condition.

The one of the first divided voltage and the second divided voltage outputted from selection circuit 167 and three-phase short-circuit signal s102 outputted from comparison circuit 168 are inputted to control circuit 20. Control circuit 20 determines that second voltage dividing circuit 692 and selection circuit 167 are functioning properly when the second divided voltage is a predetermined voltage, and determines that overvoltage detection circuit 160 is functioning properly when three-phase short-circuit signal s102 is a predetermined signal.

After an anomaly is detected in the three-phase short-circuiting, control circuit 20 inhibits the three-phase short-circuiting performed using three-phase short circuit 33, and microprocessor 50 causes three-phase bridge circuit 40 to perform the three-phase short-circuiting without using three-phase short circuit 33.

With vehicle driving device 5C according to Embodiment 6, control circuit 20 can detect an anomaly in the three-phase short-circuiting by forcing overvoltage detection circuit 160 to output three-phase short-circuit signal s102 as appropriate. If an anomaly is detected in the three-phase short-circuiting, control circuit 20 notifies, for example, the upstream controller of vehicle 1 of the anomaly, and the upstream controller issues a warning to the driver to prompt for a repair through meter display or the like. This way, it is possible to take measures including giving guidance so that the driver can ensure a higher level of safety. As described, with vehicle driving device 5C having the above configuration, it is possible to promptly discover latent malfunctions of the three-phase short-circuit control in the inverter, and increase reliability of vehicle driving device 5C.

Figure 24:
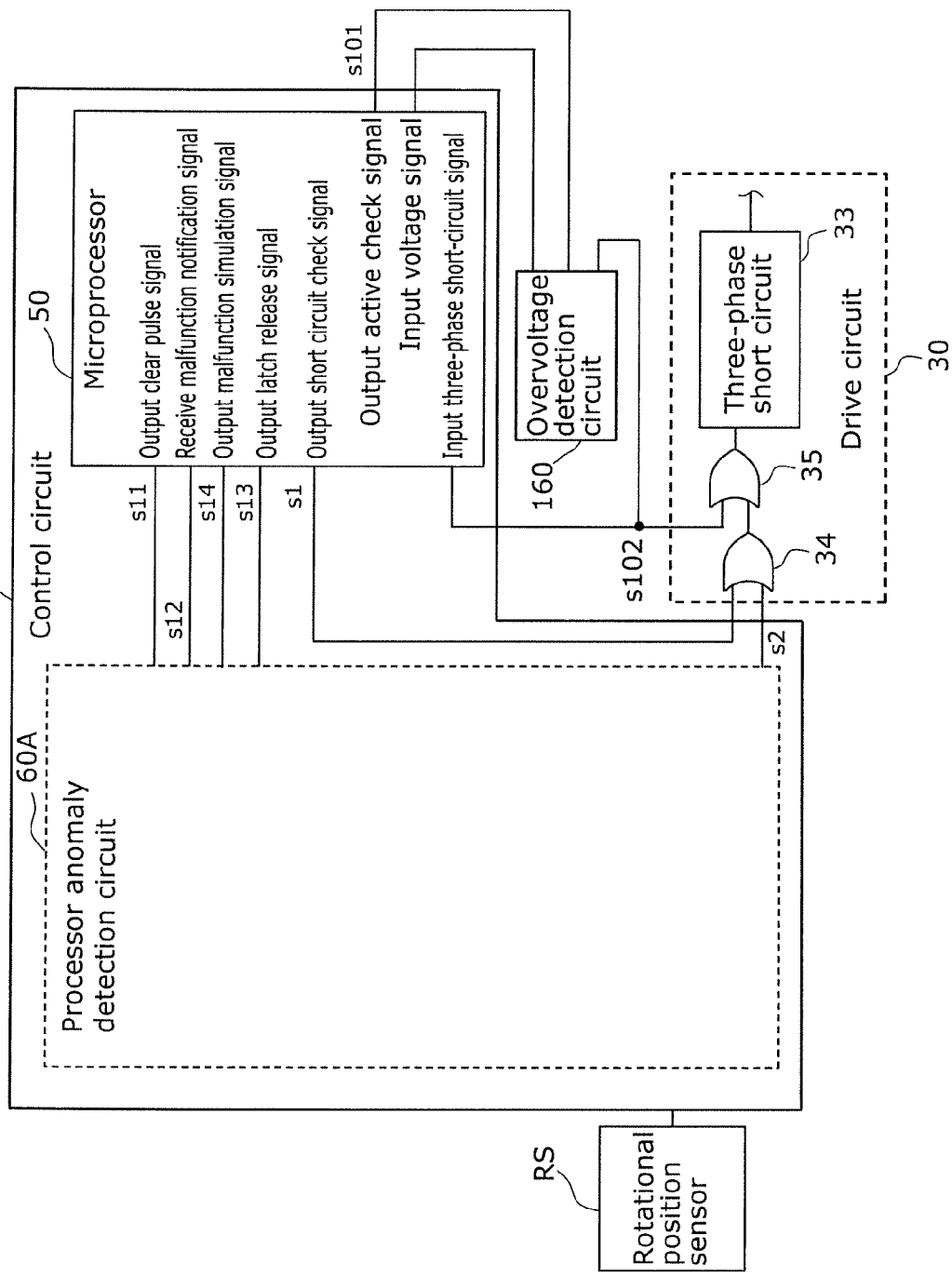
FIG. 24 is a circuit diagram illustrating another example of a processor anomaly detection circuit and an overvoltage detection circuit included in the vehicle driving device according to Embodiment 6.

Note that an example case has been described above in which vehicle driving device 5C according to Embodiment 6 includes processor anomaly detection circuit 60 of Embodiment 1 as the processor anomaly detection circuit; however, vehicle driving device 5C according to Embodiment 6 is not limited to this example case. As illustrated in FIG. 24, vehicle driving device 5C may include processor anomaly detection circuit 60A according to Embodiment 2 instead of processor anomaly detection circuit 60.

Other Embodiments

The above embodiments are essentially exemplary embodiments, and are not intended to limit the present disclosure, application thereof, and usage thereof.

Figure 9:
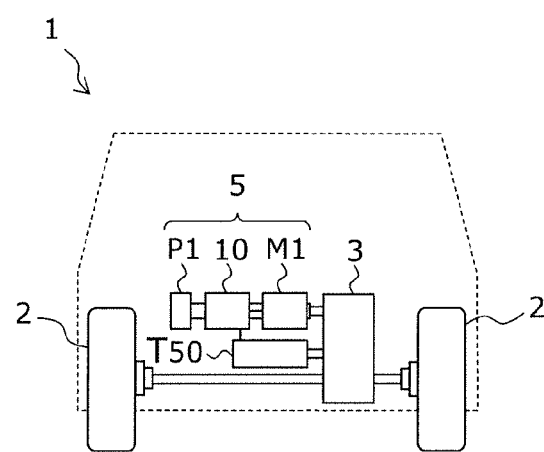
FIG. 9 is a schematic view illustrating another example of an electric vehicle including a vehicle driving device.
Figure 10:
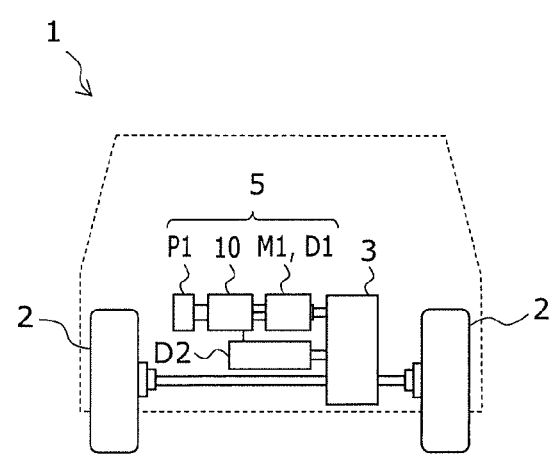
FIG. 10 is a schematic view illustrating yet another example of an electric vehicle including a vehicle driving device.

For example, in Embodiment 2, microprocessor 50 may output malfunction simulation signal s14 when motor M1 is in motion under a predetermined condition. Specifically, microprocessor 50 may output malfunction simulation signal s14 when the vehicle is traveling and motor M1 is in neither the exerting state nor the regeneration state. When the vehicle is in a stop state, microprocessor 50 may output malfunction simulation signal s14 after the current control is performed using three-phase bridge circuit 40 to pass, through motor M1, current the current value of which is not high enough to start the vehicle. In the case where torque applying device T50 which applies torque to driven wheels 2 of the vehicle is included as illustrated in FIG. 9, microprocessor 50 may, when motor M1 is regenerating, output malfunction simulation signal s14 based on a three-phase short-circuit torque which is a torque produced in motor M1 when three-phase short-circuit control is performed. Furthermore, in the case where motor M1 is one driving source D1 and the vehicle includes another driving source D2 different from driving source D1 as illustrated in FIG. 10, microprocessor 50 may output malfunction simulation signal s14 when it is possible to drive the vehicle with driving source D2 without using driving source D1.

In Embodiments 1 and 2, malfunction notification circuit 61 has been described as a watchdog timer circuit; however, malfunction notification circuit 61 is not limited to this. For example, microprocessor 50 may be a dual core processor, and may detect an anomaly using a self-examination function. Specifically, as the self-examination function, whether or not there is an anomaly is determined using a dual lock-step method. Note that according to the dual lock-step method, the dual core processor causes two processor cores to perform the same processing, and determines that there is an anomaly when the processing results do not match. In this case, malfunction notification signal s12 described in Embodiment 1 may be an anomaly output signal of the dual core processor. Apart from the above, an anomaly in the clock frequency, for example, may also be detected as the self-examination function.

Other than those described above, embodiments achieved through various modifications to the respective exemplary embodiments which may be conceived by a person skilled in the art as well as embodiments realized by arbitrarily combining the constituent elements and functions of the respective exemplary embodiments without departing from the essence of the present disclosure fall within the present disclosure.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following Japanese Patent Applications including specification, drawings and claims are incorporated herein by reference in their entirety: Japanese Patent Application No. 2019-122702 filed on Jul. 1, 2019, Japanese Patent Application No. 2019-122706 filed on Jul. 1, 2019, and Japanese Patent Application No. 2019-211210 filed on Nov. 22, 2019.

INDUSTRIAL APPLICABILITY

As described above, the present disclosure is useful as a vehicle driving device which drives an electric vehicle.

The invention claimed is:

1. A vehicle driving device, comprising:
an inverter which drives a permanent magnet motor, the inverter including:
a three-phase bridge circuit including a plurality of switching elements;
a three-phase short circuit which short-circuits three phases of the permanent magnet motor via the three-phase bridge circuit; and
a control circuit which includes:
a microprocessor which drives the three-phase bridge circuit;
a malfunction notification circuit which outputs a malfunction notification signal when the microprocessor is malfunctioning; and
a latch circuit which holds the malfunction notification signal outputted from the malfunction notification circuit, wherein
the control circuit outputs a three-phase short-circuit drive signal which drives the three-phase short circuit, based on the malfunction notification signal held by the latch circuit, and
the control circuit outputs the three-phase short-circuit drive signal when the latch circuit holds the malfunction notification signal and a rotational speed of the permanent magnet motor is greater than or equal to a predetermined rotational speed.

2. The vehicle driving device according to claim 1, wherein
the control circuit determines that the rotational speed of the permanent magnet motor is greater than or equal to the predetermined rotational speed when an integral of an output voltage outputted from a rotational position sensor provided to the permanent magnet motor is not below a threshold.

3. A vehicle driving device, comprising:
an inverter which drives a permanent magnet motor, the inverter including:
a three-phase bridge circuit including a plurality of switching elements;
a three-phase short circuit which short-circuits three phases of the permanent magnet motor via the three-phase bridge circuit; and
a control circuit which includes:
a microprocessor which drives the three-phase bridge circuit;
a malfunction notification circuit which outputs a malfunction notification signal when the microprocessor is malfunctioning; and
a latch circuit which holds the malfunction notification signal outputted from the malfunction notification circuit, wherein
the control circuit outputs a three-phase short-circuit drive signal which drives the three-phase short circuit, based on the malfunction notification signal held by the latch circuit,
the malfunction notification circuit is a watchdog timer circuit which notifies whether the microprocessor is malfunctioning, and
the malfunction notification signal is a reset signal of the watchdog timer circuit.

4. The vehicle driving device according to claim 3, wherein
the malfunction notification circuit outputs the reset signal to the microprocessor, and
when the microprocessor has succeeded in restarting properly based on the reset signal, the microprocessor outputs a latch release signal which releases the malfunction notification signal held by the latch circuit.

5. The vehicle driving device according to claim 3, wherein
the microprocessor outputs a malfunction simulation signal to the latch circuit when the reset signal is not received, the malfunction simulation signal simulatively indicating a state in which the microprocessor is malfunctioning, and
the control circuit outputs the three-phase short-circuit drive signal based on the malfunction simulation signal.

6. The vehicle driving device according to claim 5, wherein
the microprocessor outputs the malfunction simulation signal when the permanent magnet motor is in motion under a predetermined condition.

7. The vehicle driving device according to claim 5, wherein
the three-phase short circuit short-circuits the three phases of the permanent magnet motor when the three-phase short-circuit drive signal is received, and
the control circuit obtains information on at least one of (i) a change in current flowing through the three phases of the permanent magnet motor, (ii) a change in a current phase, or (iii) a change in a direct current (DC) voltage at the three-phase bridge circuit, and determines, based on the information, whether the three-phase short circuit and the latch circuit are malfunctioning.

8. A vehicle driving device, comprising:
an inverter which drives a permanent magnet motor, the inverter including:
a three-phase bridge circuit including a plurality of switching elements;
a three-phase short circuit which short-circuits three phases of the permanent magnet motor via the three-phase bridge circuit; and
a control circuit which includes:
a microprocessor which drives the three-phase bridge circuit;
a malfunction notification circuit which outputs a malfunction notification signal when the microprocessor is malfunctioning; and
a latch circuit which holds the malfunction notification signal outputted from the malfunction notification circuit, wherein
the control circuit outputs a three-phase short-circuit drive signal which drives the three-phase short circuit, based on the malfunction notification signal held by the latch circuit,
the inverter further includes an overvoltage detection circuit which detects a predetermined overvoltage at the three-phase bridge circuit, the predetermined overvoltage being a direct current (DC) voltage,
the overvoltage detection circuit outputs a three-phase short-circuit signal to the three-phase short circuit when the predetermined overvoltage is detected, and
the control circuit forces the overvoltage detection circuit to output the three-phase short-circuit signal, and detects an anomaly in three-phase short-circuiting based on at least one of (i) a change in current flowing through the three phases, (ii) a change in a current phase of the three phases, or (iii) a change in the DC voltage, which occur when the overvoltage detection circuit forcedly outputs the three-phase short-circuit signal.

9. The vehicle driving device according to claim 8, wherein
the overvoltage detection circuit includes:
- a first voltage dividing circuit which obtains a first divided voltage through voltage division by performing resistance division on the DC voltage;
- a second voltage dividing circuit which obtains a second divided voltage through voltage division by performing resistance division on a predetermined voltage, the second divided voltage being detected as the predetermined overvoltage;
- a selection circuit which selects and outputs one of the first divided voltage and the second divided voltage; and
- a comparison circuit which compares a reference voltage with the one of the first divided voltage and the second divided voltage outputted from the selection circuit, and outputs the three-phase short-circuit signal based on a comparison result, and the control circuit forces the overvoltage detection circuit to output the three-phase short-circuit signal by causing the selection circuit to output the second divided voltage when the permanent magnet motor is in motion under a predetermined condition.

10. The vehicle driving device according to claim 9, wherein
the one of the first divided voltage and the second divided voltage outputted from the selection circuit and the three-phase short-circuit signal outputted from the comparison circuit are inputted to the control circuit, and
the control circuit determines that the second voltage dividing circuit and the selection circuit are functioning properly when the second divided voltage is a predetermined voltage, and determines that the overvoltage detection circuit is functioning properly when the three-phase short-circuit signal is a predetermined signal.

11. The vehicle driving device according to claim 10, wherein
after an anomaly is detected in the three-phase short-circuiting, the control circuit inhibits the three-phase short-circuiting performed using the three-phase short circuit, and the microprocessor causes the three-phase bridge circuit to perform the three-phase short-circuiting without using the three-phase short circuit.

* * * * *